(12) United States Patent
Bandosz et al.

(10) Patent No.: US 8,722,571 B2
(45) Date of Patent: May 13, 2014

(54) PROCESS TO PREPARE ADSORBENTS FROM ORGANIC FERTILIZER AND THEIR APPLICATIONS FOR REMOVAL OF ACIDIC GASES FROM WET AIR STREAMS

(75) Inventors: Teresa J. Bandosz, Teaneck, NJ (US); Andriy Bahryeyev, New York, NY (US); David C. Locke, Brooklyn, NY (US)

(73) Assignee: Research Foundation of the City University of New York, New York, NY (US)

(*) Notice: Subject to any disclaimer, the term of this patent is extended or adjusted under 35 U.S.C. 154(b) by 0 days.

(21) Appl. No.: 13/466,097

(22) Filed: May 7, 2012

(65) Prior Publication Data

US 2013/0059152 A1 Mar. 7, 2013

Related U.S. Application Data

(63) Continuation of application No. 12/889,058, filed on Sep. 23, 2010, now abandoned, which is a continuation of application No. 11/206,371, filed on Aug. 17, 2005, now abandoned, which is a continuation of application No. 09/997,398, filed on Nov. 29, 2001, now abandoned.

(60) Provisional application No. 60/253,860, filed on Nov. 29, 2000.

(51) Int. Cl.
*C01B 31/10* (2006.01)

(52) U.S. Cl.
USPC .......................................... 502/430; 502/420

(58) Field of Classification Search
USPC .................................................. 502/420, 430
See application file for complete search history.

(56) References Cited

U.S. PATENT DOCUMENTS

| | | | |
|---|---|---|---|
| 3,619,420 A | 11/1971 | Kemmer et al. | |
| 3,887,461 A | 6/1975 | Nickerson et al. | |
| 3,998,756 A | 12/1976 | Sutherland | |
| 3,998,757 A | 12/1976 | Foster | |
| 4,122,036 A | 10/1978 | Lewis | |
| 4,273,751 A | 6/1981 | Sinha et al. | |
| 4,921,826 A | 5/1990 | Juntgen et al. | |
| 5,024,682 A | 6/1991 | Turk | |
| 5,254,521 A * | 10/1993 | Knudson ....................... | 502/432 |
| 5,338,462 A | 8/1994 | Abe et al. | |
| 5,356,849 A | 10/1994 | Matviya et al. | |
| 6,030,922 A | 2/2000 | Khalili et al. | |
| 6,962,616 B1 | 11/2005 | Bandosz et al. | |

FOREIGN PATENT DOCUMENTS

| | | |
|---|---|---|
| DE | 4102557 | 7/1992 |
| EP | 0729783 | 9/1996 |
| GB | 1385453 | 2/1975 |
| JP | 11-057399 | 3/1999 |
| JP | 2000-319011 | 11/2000 |

OTHER PUBLICATIONS

Cariso et al., Carbon, "Oxidation of Hydrogen Sulfide Over Microporous Carbons," 13: 233-239, 1975.
Lu, Environ. Tech., 16, 495, 1995.
Stejns et al., Ind. Eng. Chem. Prod. Res. Dev., "Catalytic Oxidation of Hydrogen Sulfide. Influence of Pore Structure and Chemical Composition of Various Porous Substances," 16, 35-41, 1977.
Bagreev, A., et al., Elsevier Science Ltd., Carbon 39, "Pore Structure and Surface Chemistry of Adsorbents Obtained by Pyrolysis of Sewage Sludge-Derived Fertilizer," pp. 1971-1979, 2001.
Bagreev, A., et al., Environ. Sci. Technol, vol. 35, "Sewage Sludge-Derived Materials as Efficient Adsorbents for Removal of Hydrogen Sulfide," pp. 1537-1543, 2001.
Bashkova, S., et al., Environ. Sci. Technol, vol. 35, "Adsorption of SO2 on Sewage Sludge-Derived Materials," pp. 3263-3269, 2001.
M. Tettamanti et al., Environ. Sci. Technol, vol. 35, "Thermal Oxidation Kinetics and Mechanism of Sludge From a Wastewater Treatment Plant," pp. 3981-3987, 2001.
Piskorz, J.; Scott, D.S.; Westerberg, I.B. Flash pyrolysis of sewage sludge; Proc. Eng. Chem. Des. Dev., 1996, 25: 265-270.
Lu, G.Q.; Preparation and Evaluation of Adsorbents from Waste Carbonaceous Materials for Sox and Nox Removal. Environmental Progress 1996, 15:12.
Lu, G.Q.; Lau, D.D.; Characterization of Sewage Sludge-Derived Adsorbents for H2S Removal. Part 2: Surface and Pore Structural Evolution in Chemical Activation. Gas. Sep. Purif. 1996, 10:103.
Chiang, P.C.; You, J.H.; Use of Sewage Sludge for Manufacturing Adsorbents. Canadian J. Chem. Eng. 1987, 65:922.
Lu, G.Q.; Low, J.C.F.; Lui, C.Y.; Lua, A.C. Surface Area Development of Sewage Sludge During Pyrolysis. Fuel 1995, 74:344.
Katoh, H.; Kuniyoshi, I.; Hirai, M.; Shoda, M. Studies of the oxidation mechanism of sulphur-containing gases on wet activated carbon fibre; Applied Catalysis B: Environmental 6 (1995) 255-262.
Adib, F.; Bagreev, A.; Bandosz, T.J.; Analysis of the Relationship between H2S Removal Capacity and Surface Properties of Unimpregnated Activated Carbons. Environmental Science & Technology; 2000, vol. 34, No. 4, 686-692.
Adib, F.; Bagreev, A.; Bandosz, T.J.; Effect of Surface Characteristics of Wood-Based Activated Carbons on Adsorption of Hydrogen Sulfide. Journal of Colloid and Interface Science 1999, 214, 407-415.
Adib, F.; Bagreev, A.; Bandosz, T.J.; Effect of pH and Surface Chemistry on the Mechanism of H2S Removal by Activated Carbons. Journal of Colloid and Interface Science 1999, 216, 360-369.

* cited by examiner

*Primary Examiner* — Stuart Hendrickson
(74) *Attorney, Agent, or Firm* — Troutman Sanders LLP

(57) ABSTRACT

The invention is directed to an adsorbent comprising: a) 20-30% porous carbon with incorporated organic nitrogen species; and b) 70-80% inorganic matter. The invention is directed to a method of making an adsorbent which comprises: a) thermally drying dewatered sewage sludge to form granulated organic fertilizer; and b) pyrolyzing said the organic fertilizer at temperatures between 600 and 1000° C. The invention is additionally directed to the process of removing acidic gases from wet air streams comprising putting an adsorbent in contact with the wet air stream and allowing the adsorbent to adsorb the acidic gases.

5 Claims, 17 Drawing Sheets

Figure 1:
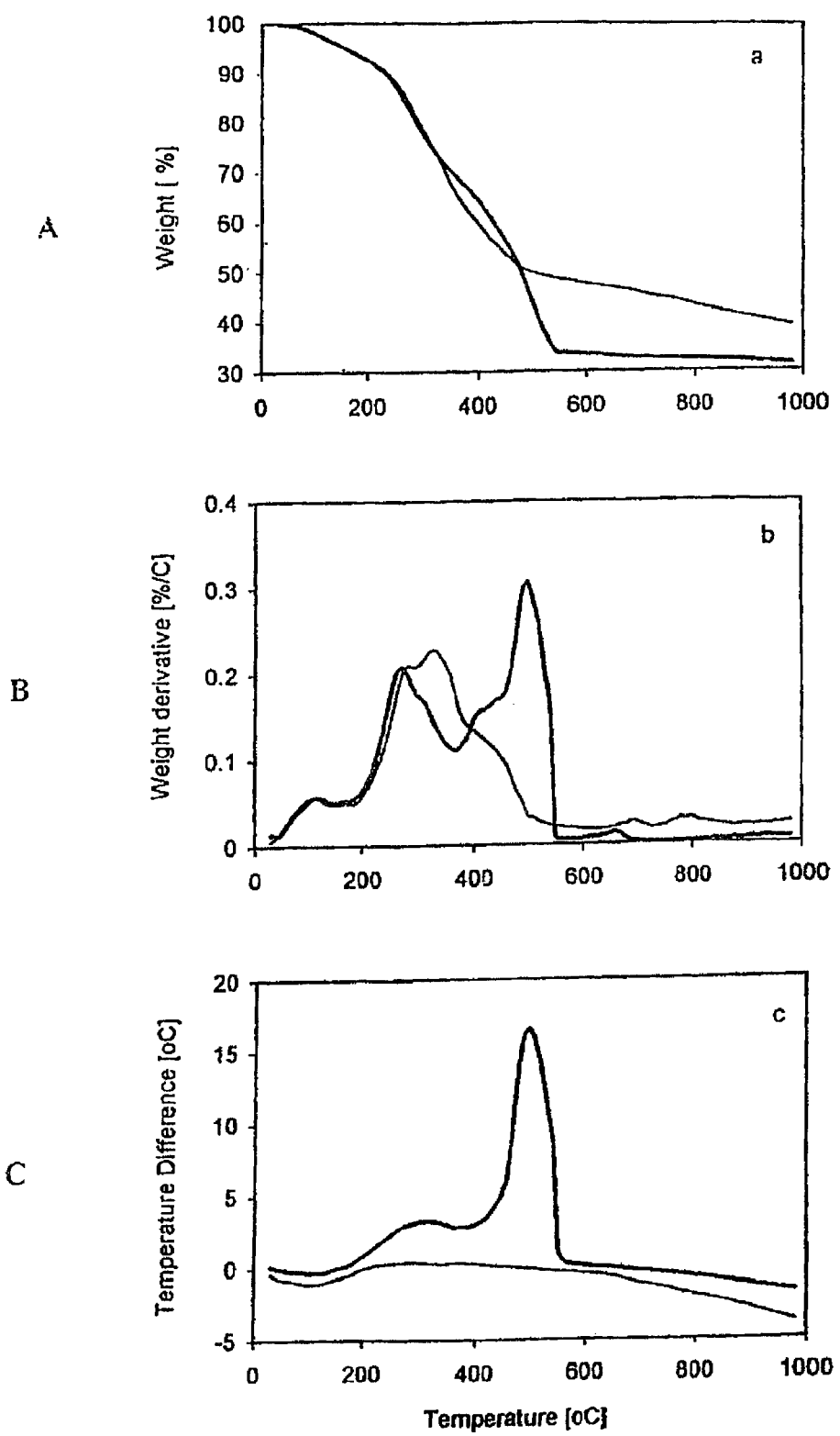

PROCESS TO PREPARE ADSORBENTS FROM ORGANIC FERTILIZER AND THEIR APPLICATIONS FOR REMOVAL OF ACIDIC GASES FROM WET AIR STREAMS

This application is a continuation of U.S. patent application Ser. No. 12/889,058 filed on Sep. 23, 2010, now abandoned which is a continuation application of U.S. patent application Ser. No. 11/206,371, filed on Aug. 17, 2005, now abandoned which is a continuation application of U.S. patent application Ser. No. 09/997,398, filed on Nov. 29, 2001, now abandoned which claims priority to U.S. Provisional Application No. 60/253,860, filed on Nov. 29, 2000, all of which are herein incorporated by reference.

Numerous references, including patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entirety and to the same extent as if each reference was individually incorporated by reference.

1. FIELD OF THE INVENTION

The invention is directed to an adsorbent comprising: a) 20-30% porous carbon with incorporated organic nitrogen species; and b) 70-80% inorganic matter. The invention is directed to a method of making an adsorbent which comprises: a) thermally drying dewatered sewage sludge to form granulated organic fertilizer; and b) pyrolyzing said the organic fertilizer at temperatures between 600 and 1000° C. The invention is additionally directed to the processes of removing acidic gases from wet air streams comprising putting an adsorbent in contact with the wet air stream and allowing the adsorbent to adsorb the acidic gases.

2. BACKGROUND OF THE INVENTION

Growing concerns about the environment has resulted in development of new environmentally friendly technologies, new materials, and new ways to reduce and minimize wastes [Manahan, S. E. Environmental Chemistry, 6th ed., CRC Press: Boca Raton, Fla., 1994]. One of the wastes produced by contemporary society in abundant quantity is municipal sewage sludge, euphemistically often referred to as biosolids. Biosolids are a mixture of exhausted biomass generated in the aerobic and anaerobic digestion of the organic constituents of municipal sewage along with inorganic materials such as sand and metal oxides. According to the United States Environmental Protection Agency (EPA), 6.9 million tons of biosolids (dry basis) were generated in 1998 and only 60% were used beneficially [Biosolid Generation, Use, and Disposal in The United States: EPA530-R-99-009, September 1999; www.epa.gov]. The EPA report estimates an annual 2% increase in the quantity of biosolids produced.

The abundance of raw sewage sludge produces one of the major environmental problems of contemporary civilization. Various methods have been proposed for its disposal [Manahan S. E. Environmental Chemistry, 6th ed., CRC Press: Boca Raton, Fla., 1994]. Ocean dumping was popular until recently, however is no longer an option because of stricter environmental regulations [Biosolid Generation, Use, and Disposal in The United States: EPA530-R-99-009, September 1999; www.epa.gov]. Among the most often used methods of disposal are landfilling, cropland application, and incineration [Manahan S. E. Environmental Chemistry, 6th ed.; CRC Press: Boca Raton, Fla., 1994.]. Other methods that have been used to dispose of or utilize municipal sewage sludge [Biosolid Generation, Use, and Disposal in The United States: EPA530-R-99-009, September 1999; www.epa.gov], include road surfacing, conversion to fertilizer, compression into building blocks, and carbonization [Manahan, S. E. Environmental Chemistry, 6th ed., CRC Press: Boca Raton, Fla., 1994; Biosolid Generation, Use, and Disposal in The United States: EPA530-R-99-009, September 1999; www.epa.gov; Sutherland, J. U.S. Pat. No. 3,998,757 (1976); Nickerson, R. D.; Messman, H. C., U.S. Pat. No. 3,887,461 (1975)]. Specifically, the residue of incineration can be used in construction materials or road surfacing.

Although incineration is effective in reducing the volume of sludge and produces useful end products, cleaning of the flue gases generated requires effective and expensive scrubbers. The application of raw sewage sludge as a fertilizer produces odor problems and is also associated with the risk of contamination of the soil by heavy metals and pathogens. A more efficaceous and safer alternative is the pyrolytic carbonization of sludge to obtain useful sorbents [Piskorz J, Scott D S, Westerberg, I B. Flash pyrolysis of sewage sludge, Ind. Proc. Des. Dev. 1996; 25: 265-270; Chiang, P C., You, J H. Use of sewage sludge for manufacturing adsorbents, Can. J. Chem. Eng. 1987; 65: 922-927; Lu, G Q, Low J C F, Liu C Y, Lau A C. Surface area development of sewage sludge during pyrolysis, Fuel 1995; 74: 3444-3448; Lu G Q, Lau D D. Characterization of sewage sludge-derived adsorbents for $H_2S$ removal. Part 2: surface and pore structural evolution in chemical activation. Gas Sep. Purif. 1996; 10: 103-111; Lewis F M. Method of pyrolyzing sewage sludge to produce activated carbon, U.S. Pat. No. 4,122,036 (1977)].

Since 1976, several patents have been issued on carbonization of sewage sludge and various applications of the final materials [Nickerson, R. D.; Messman, H. C., U.S. Pat. No. 3,887,461(1975); Lewis, F. M. U.S. Pat. No. 4,122,036 (1977); Kemmer, F. N.; Robertson, R. S.; Mattix, R. D. U.S. Pat. No. 3,619,420 (1971)]. The carbonization of sludge was first patented by Hercules, Inc. [Sutherland, J. Preparation of activated carbonaceous material from sewage sludge and sulfuric acid. U.S. Pat. No. 3,998,757 (1976)]. The process was further investigated by Chiang and You [Chiang, P C., You, J H. Use of sewage sludge for manufacturing adsorbents, Can. J. Chem. Eng. 1987; 65: 922-927] and Lu, et al. [Lu, G Q, Low J C F, Liu C Y, Lau A C. Surface area development of sewage sludge during pyrolysis, Fuel 1995; 74: 3444-3448.; Lu G Q, Lau D D. Characterization of sewage sludge-derived adsorbents for $H_2S$ removal. Part 2: surface and pore structural evolution in chemical activation. Gas Sep. Purif. 1996; 10: 103-111]. Both simple pyrolysis and pyrolysis after addition of chemical activation agents such as zinc chloride or sulfuric acid were used. Carbonization of sludge in the presence of chemical activating agents such as zinc chloride and sulfuric acid produces new sorbents, with patented applications in such processes as removal of organics in the final stages of water cleaning [Lewis, F. M. U.S. Pat. No. 4,122, 036 (1977)] and removal of chlorinated organics [Kemmer, F. N.; Robertson, R. S.; Mattix, R. D. U.S. Pat. No. 3,619,420 (1971)].

The process of carbonization of biosolids has been studied in detail using different chemical agents and various conditions [Chiang, P. C.; You, J. H. Can. J. Chem. Eng. 1987, 65, 922; Lu, G. Q; Low J. C. F.; Liu, C. Y.; Lau A. C. Fuel 1995, 74, 3444; Lu, G. Q.; Lau, D. D. Gas Sep. Purif. 1996, 10, 103; Lu, G. Q. Environ. Tech. 1995, 16, 495]. The sorbents obtained had relatively high surface area (100-200 m²/g for physical activation and up to 400 m²/g for chemical activation) and developed microporosity. As suggested by Chiang and You, the high content of inorganic matter, usually around 75%, together with the microporosity promotes the adsorption of organic species such as methyl ethyl ketone or toluene [Chiang, P C., You, J H. Use of sewage sludge for manufacturing adsorbents, Can. J. Chem. Eng. 1987; 65: 922-927]. In general, materials obtained as a result of the treatment have surface areas between 100 and 500 m²/g, but their performance as adsorbents has been demonstrated to be much worse than that of activated carbons. The ability of these adsorbents to remove organics such as phenols, or sulfur dioxide and hydrogen sulfide [Lu, G. Q.; Lau, D. D. Gas Sep. Purif. 1996, 10, 103; Lu, G. Q. Environ. Tech. 1995, 16, 495] have been tested so far; their capacity for the adsorption of $SO_2$ reported by Lu was less than 10% of the capacity of Ajax activated carbon [Lu, G. Q. Environ. Tech. 1995, 16, 495]. Lu and coworkers used the sorbents obtained from sludge by chemical activation as media for the removal of hydrogen sulfide [Lu G Q, Lau D D. Characterization of sewage sludge-derived adsorbents for $H_2S$ removal. Part 2: surface and pore structural evolution in chemical activation. Gas Sep. Purif. 1996; 10: 103-111]. Their removal capacity was only 25% of that of Calgon activated carbons and the mechanism and efficiency of the process were not studied in detail.

Since hydrogen sulfide is the main source of odor from sewage treatment plants the possibility of using sewage sludge as a source of adsorbents for $H_2S$ is appealing. The idea is even more attractive when the mechanism of adsorption of hydrogen sulfide is taken into account. As proposed elsewhere [Hedden K, Huber L, Rao B R. Adsorptive Reinigung von Schwefelwasserstoffhaltigen Abgasen VDI Bericht 1976;37: 253; Adib F, Bagreev A, Bandosz T J. Effect of surface characteristics of wood based activated carbons on removal of hydrogen sulfide. J. Coll. Interface Sci. 1999; 214: 407-415; Adib F, Bagreev A, Bandosz TJ. Effect of pH and surface chemistry on the mechanism of $H_2S$ removal by activated carbons. J. Coll. Interface Sci. 1999; 216: 360-369] $H_2S$ is first adsorbed in the water film present on the carbon surface, followed by dissociation and adsorption of $HS^-$ in the micropores. In the next step, $HS^-$ is oxidized to various sulfur species. The speciation of the final products of oxidation depends on the pH of the activated carbon surface [Adib F, Bagreev A, Bandosz T J. Effect of pH and surface chemistry on the mechanism of $H_2S$ removal by activated carbons. J. Coll. Interface Sci. 1999; 216: 360-369; Adib F, Bagreev A, Bandosz T J. Analysis of the relationship between $H_2S$ removal capacity and surface properties of unimpregnated activated carbons. Environ. Sci. Technol. 2000; 34: 686-692; Adib F, Bagreev A, Bandosz T J. Adsorption/oxidation of hydrogen sulfide on nitrogen modified activated carbons. Langmuir 2000; 16: 1980-1986]. This mechanism is based on the study on unmodified carbons [Adib F, Bagreev A, Bandosz T J. Effect of surface characteristics of wood based activated carbons on removal of hydrogen sulfide. J. Coll. Interface Sci. 1999; 214: 407-415; Adib F, Bagreev A, Bandosz T J. Effect of pH and surface chemistry on the mechanism of $H_2S$ removal by activated carbons. J. Coll. Interface Sci. 1999; 216: 360-369; Adib F, Bagreev A, Bandosz T J. Analysis of the relationship between $H_2S$ removal capacity and surface properties of unimpregnated activated carbons. Environ. Sci. Technol. 2000; 34: 686-692]. In the case of catalytic carbons containing nitrogen it was proposed that nitrogen-containing basic centers located in the micropores are the high energy adsorption sites playing an important role in the oxidation of hydrogen sulfide to sulfuric acid [Adib F, Bagreev A, Bandosz T J. Adsorption/oxidation of hydrogen sulfide on nitrogen modified activated carbons. Langmuir 2000; 16: 1980-1986.]. The latter as the final product makes the regeneration feasible using simple methods such as washing with water [Adib F, Bagreev A, Bandosz T J. On the possibility of water regeneration of impregnated activated carbons used as hydrogen sulfide adsorbents, Ind. Eng. Chem. Res. 2000; 39: 2439-2446; Bagreev A, Rahman H, Bandosz T J. Study of $H_2S$ adsorption and water regeneration of spent coconut-based activated carbon. Environ. Sci. Technol. 2000; 34: 4587-4592]. In the case of catalytic carbons such as Centaur® the basic centers are introduced using the special urea modification process [Matviya T M, Hayden R A. Catalytic Carbon. U.S. Pat. No. 5,356,849 (1994)]. Since sewage sludge contains a considerable amount of organic nitrogen, carbonization of such species can lead to the creation of basic nitrogen groups within the carbon matrix which again have been proven to be important in the oxidation of $H_2S$ [Adib F, Bagreev A, Bandosz T J. Adsorption/oxidation of hydrogen sulfide on nitrogen modified activated carbons. Langmuir 2000; 16: 1980-1986; Matviya T M, Hayden R A. Catalytic Carbon. U.S. Pat. No. 5,356,849 (1994)]. Another advantage to the use of sludge as a starting material is the presence of significant amounts of iron added to the raw sludge as a dewatering conditioner; iron is also considered to be a catalyst for $H_2S$ oxidation [Katoh H., Kuniyoshi I., Hirai M., Shoda M. Studies of the oxidation mechanism of sulfur containing gases on wet activated carbon fibre. Appl. Cat. B: Environ. 1995;6: 255-262; Stejns M, Mars P. Catalytic oxidation of hydrogen sulphide. Influence of pore structure and chemical composition of various porous substances. Ind. Eng. Chem. Prod. Res. Dev. 1977; 16: 35-41; Cariaso, O. C. and Walker P L. Oxidation of hydrogen sulphide over microporous carbons. Carbon 1975; 13: 233-239].

Primarily caustic-impregnated carbons have been used as adsorbents of hydrogen sulfide at sewage treatment plants. Because of the presence of KOH or NaOH their pH is high, which ensures that hydrogen sulfide is oxidized to elemental sulfur. The process is fast and caustic impregnated carbons have high hydrogen sulfide breakthrough capacity. Such materials have a $H_2S$ breakthrough capacity measured using accelerated test (not suitable for virgin carbons and other adsorbents), which should be around 140 mg/g. In one example of its use, the New York City Department of Environmental Protection installed 118 carbon vessels in 12 sewage treatment plants. Each vessel contains about 10 tons of activated carbon adsorbent.

Caustic-impregnated carbons, although efficient for $H_2S$ removal, have many disadvantages which recently have attracted the attention of researchers toward alternative sorbents, unmodified activated carbons. The disadvantages of caustic-impregnated carbons are as follows:
1) Limited capacity for physical adsorption of VOCs (volatile organic compounds) due to the presence of caustic materials in the carbon pore system.
2) Low self-ignition temperature, which may result in fire inside the carbon vessel.
3) Special safety precautions in dealing with caustic materials have to be applied.
4) High density because of the presence of water.
5) Higher cost than that of unmodified carbons.

The results of recent studies have shown that at very low concentrations of hydrogen sulfide (as is present at sewage treatment plants), unmodified carbons can work effectively as adsorption/oxidation media. Thus, there is a great interest in the development of new types of adsorbents for use in sewage treatment facilities.

3. SUMMARY OF THE INVENTION

This invention is directed to an adsorbent comprising: a) 20-30% porous carbon with incorporated organic nitrogen species; and b) 70-80% inorganic matter. This invention is further directed to a method of making an adsorbent which comprises thermally drying dewatered sewage sludge to form granulated organic fertilizer and pyrolyzing said the organic fertilizer at temperatures between 600 and 1000° C. This invention is directed to the process of removing acidic gases from wet air streams comprising putting an adsorbent comprising 20-30% porous carbon with incorporated organic nitrogen species and 70-80% inorganic matter in contact with the wet air stream and allowing the adsorbent to adsorb the acidic gases. This invention is further directed to the process of removing acidic gases from wet air streams comprising forming an adsorbent by thermally drying dewatered sewage sludge to form granulated organic fertilizer and pyrolyzing said organic fertilizer at temperatures between 600-1000° C., putting said adsorbent in contact with the wet air stream, and allowing the adsorbent to adsorb the acidic gases.

4. BRIEF DESCRIPTION OF THE FIGURES

FIG. 1. (A) TG, (B) DTG, and (C) DTA curves for pyrolysis of sludge-derived fertilizer in air (solid heavy lines) and nitrogen (solid thin lines).

Figure 2:
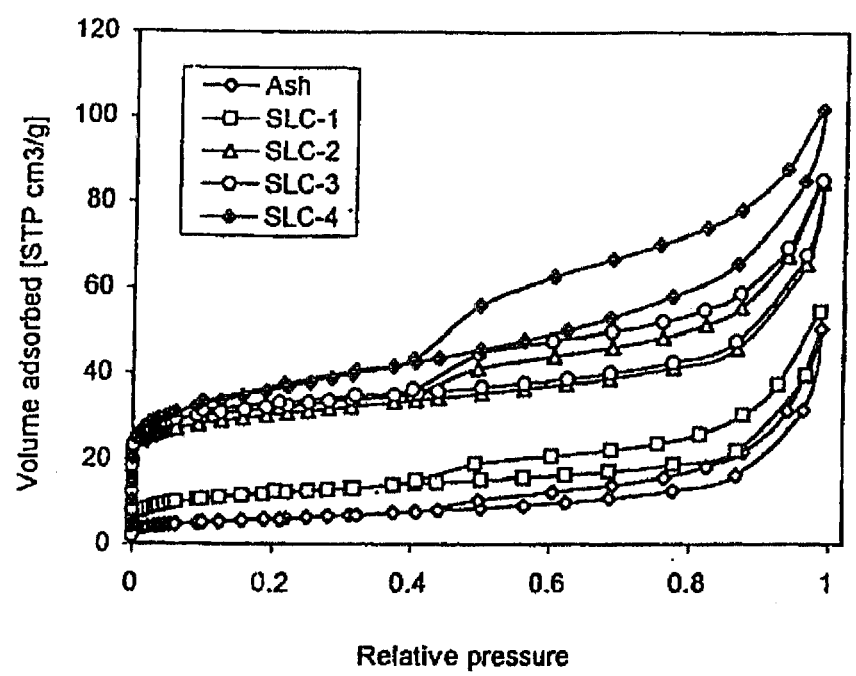

FIG. 2. Nitrogen adsorption isotherms for ash and the sludge derived materials.

Figure 3:
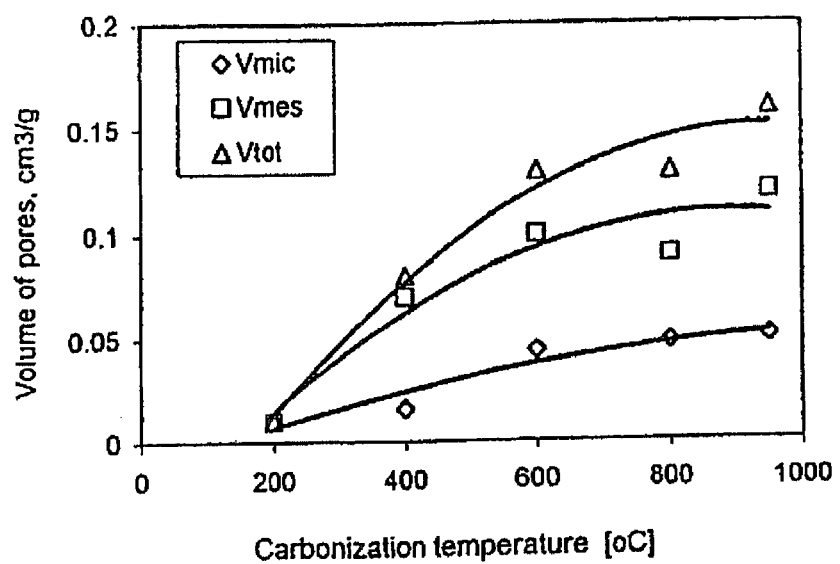

FIG. 3. Development of porosity with increasing pyrolysis temperature.

Figure 4:
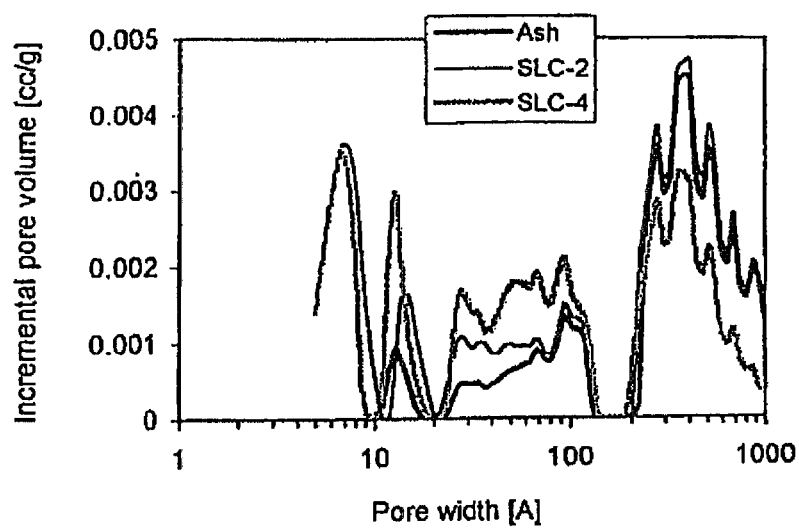

FIG. 4. Pore size distributions for ash and the sludge derived materials.

Figure 5:
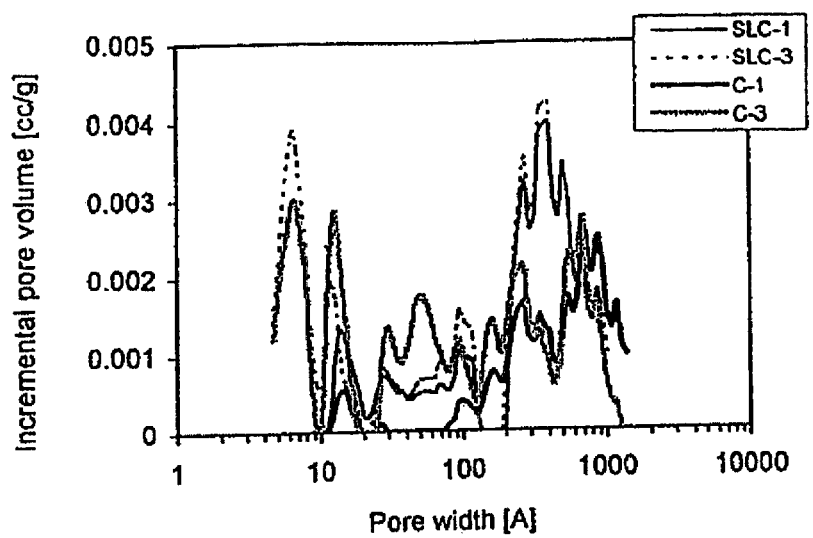

FIG. 5. Comparison of the pore size distribution for SLC-1 and SLC-3 and their acid-washed counterparts.

Figure 6:
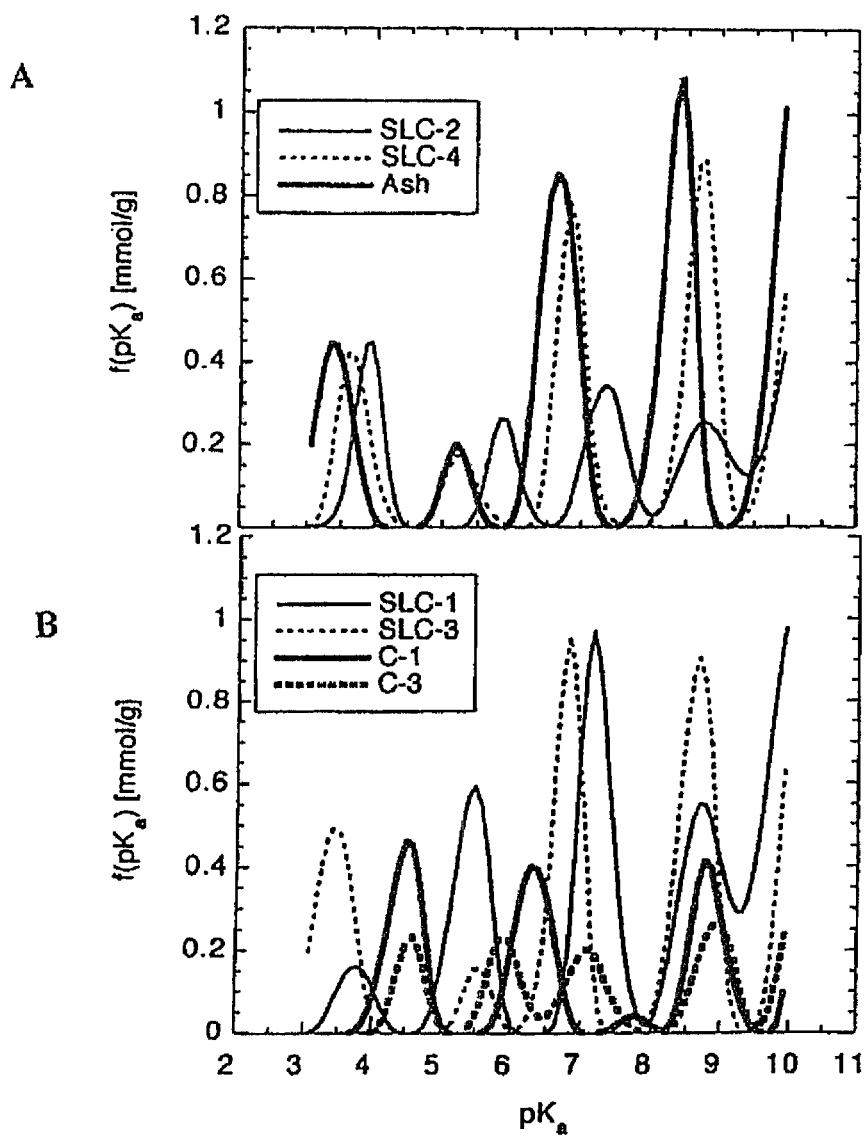

FIG. 6. pKa distributions for the materials studied.

Figure 7:
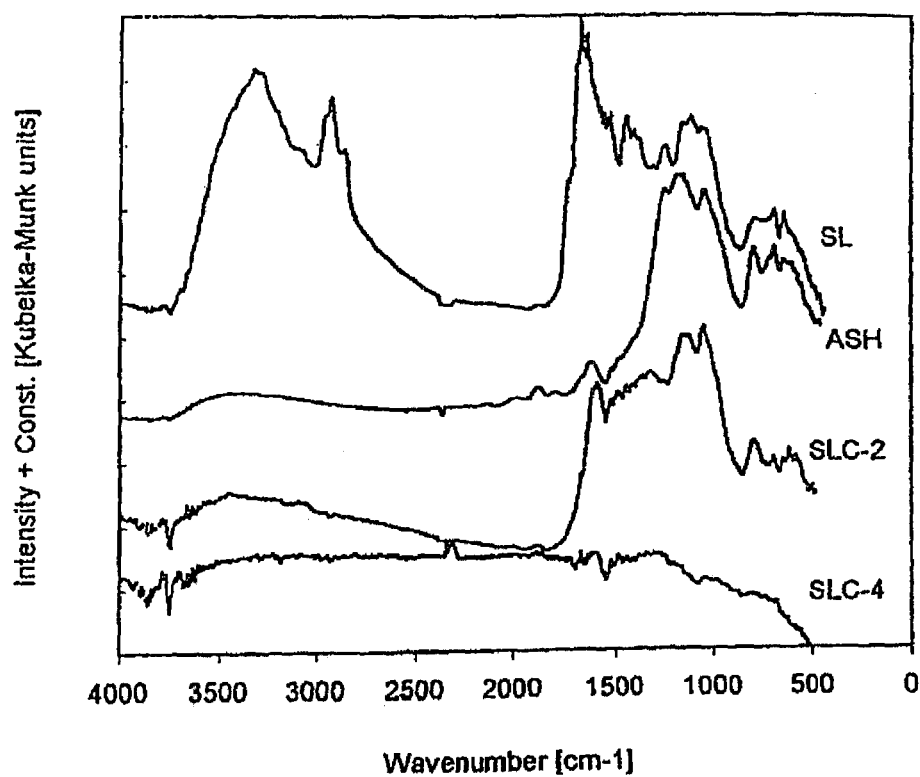

FIG. 7. FTIR curves for the initial sludge, ash and SLC-2 and SLC-4.

Figure 8:
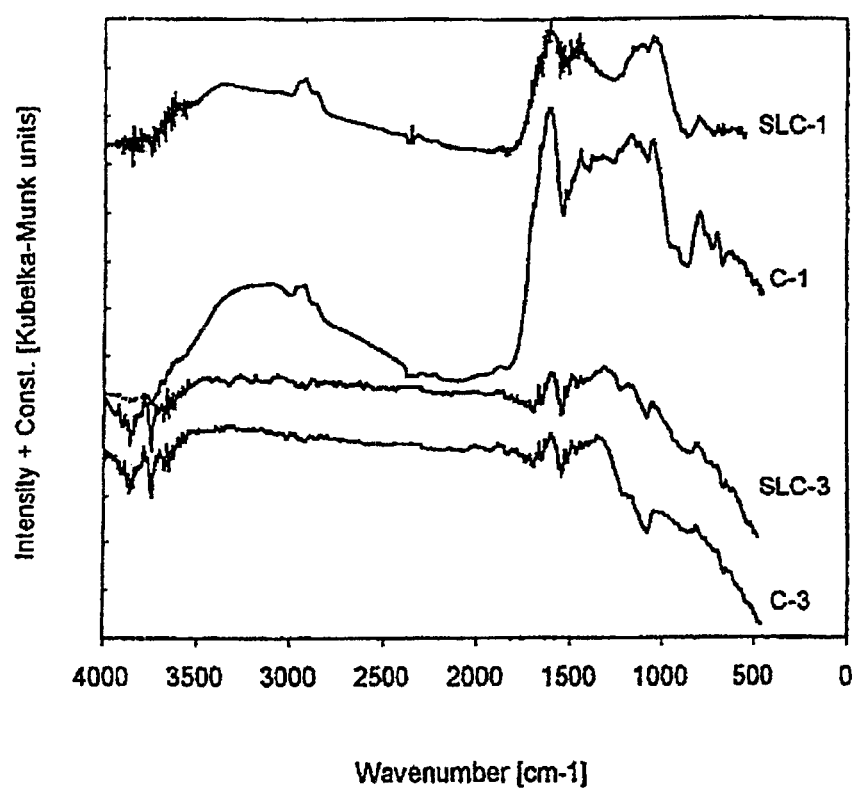

FIG. 8. FTIR curves for SLC-1 and SLC-3 and their acid-washed counterparts.

Figure 9:
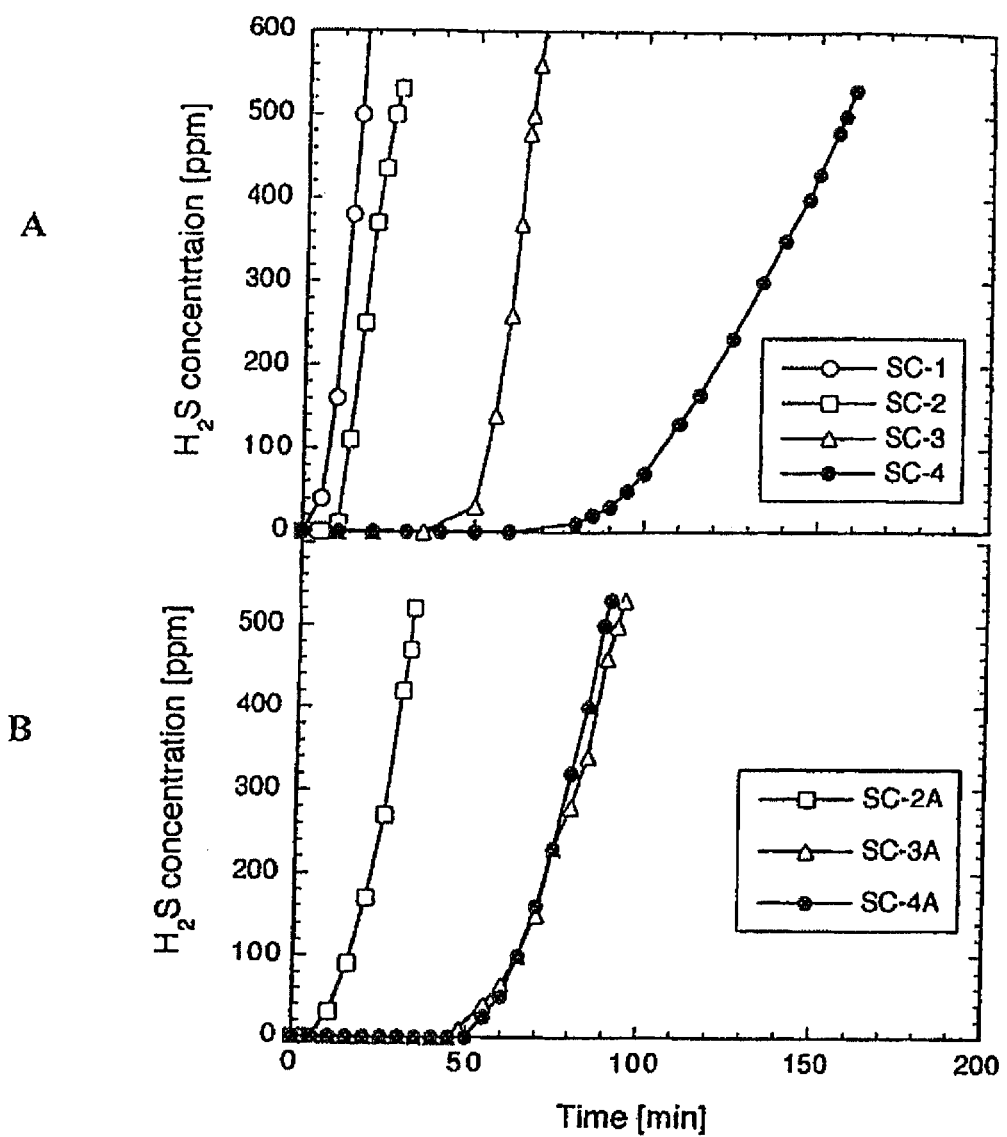

FIG. 9. $H_2S$ breakthrough curves for initial sludge-derived adsorbents and sludge-derived adsorbents after acid treatment.

Figure 10:
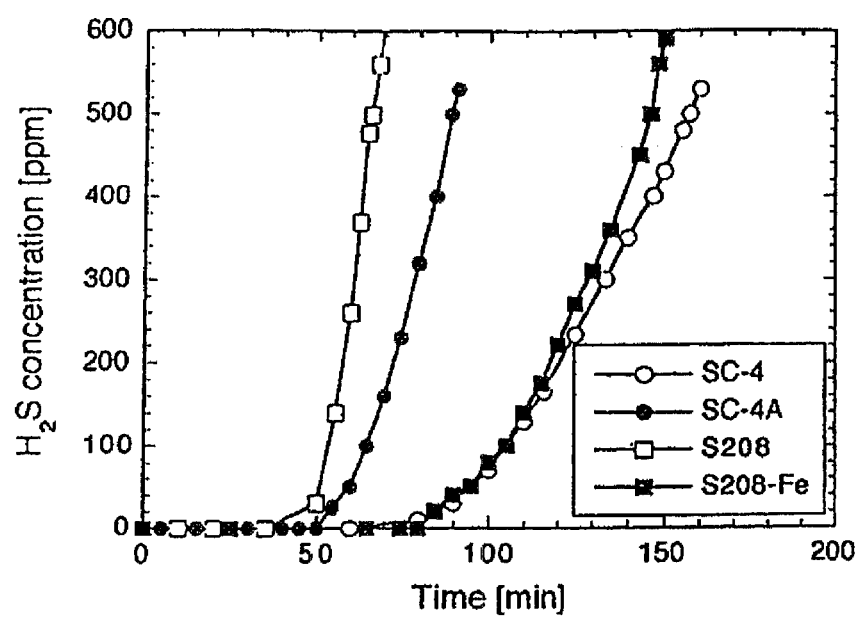

FIG. 10. Comparison of the $H_2S$ breakthrough curves obtained for SC-4, SC-4A and S208 and S208-Fe.

Figure 11:
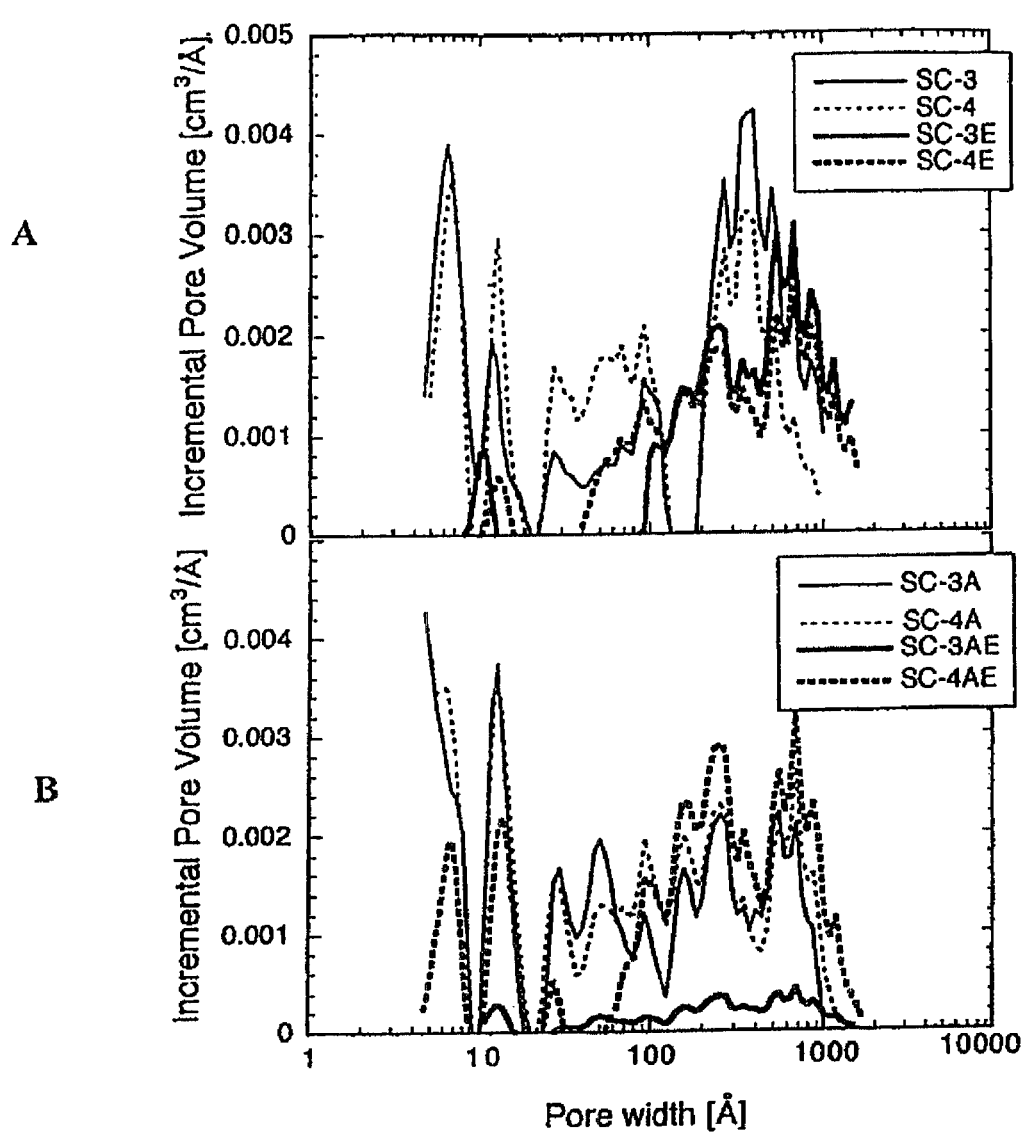

FIG. 11. Changes in pore size distributions for the sludge-derived samples before and after $H_2S$ adsorption.

Figure 12:
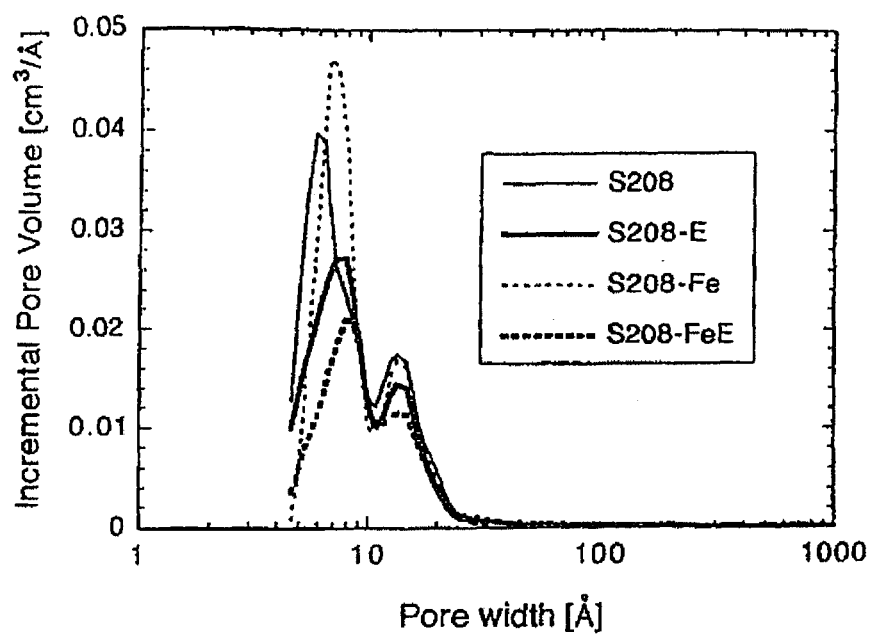

FIG. 12. Changes in pore size distributions for S208 series of samples before and after $H_2S$ adsorption.

Figure 13:
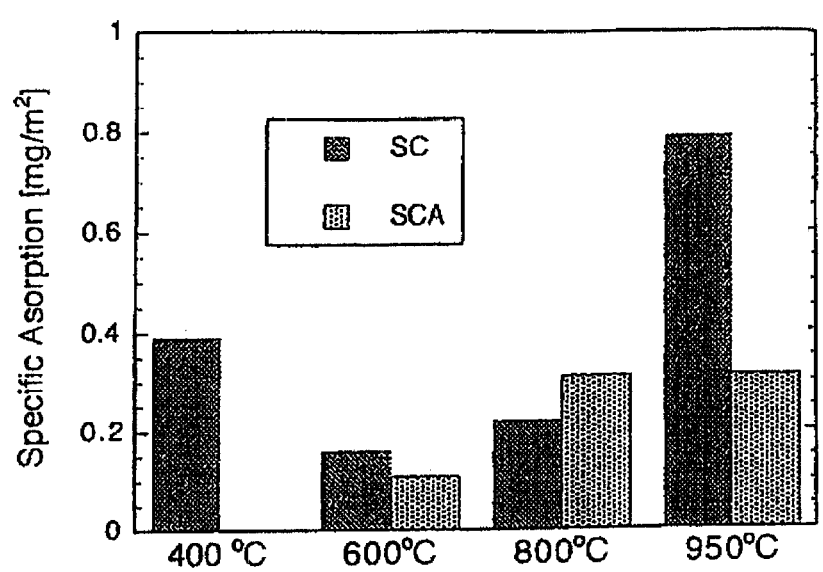

FIG. 13. Specific $H_2S$ adsorption vs temperature of heat treatment.

Figure 14:
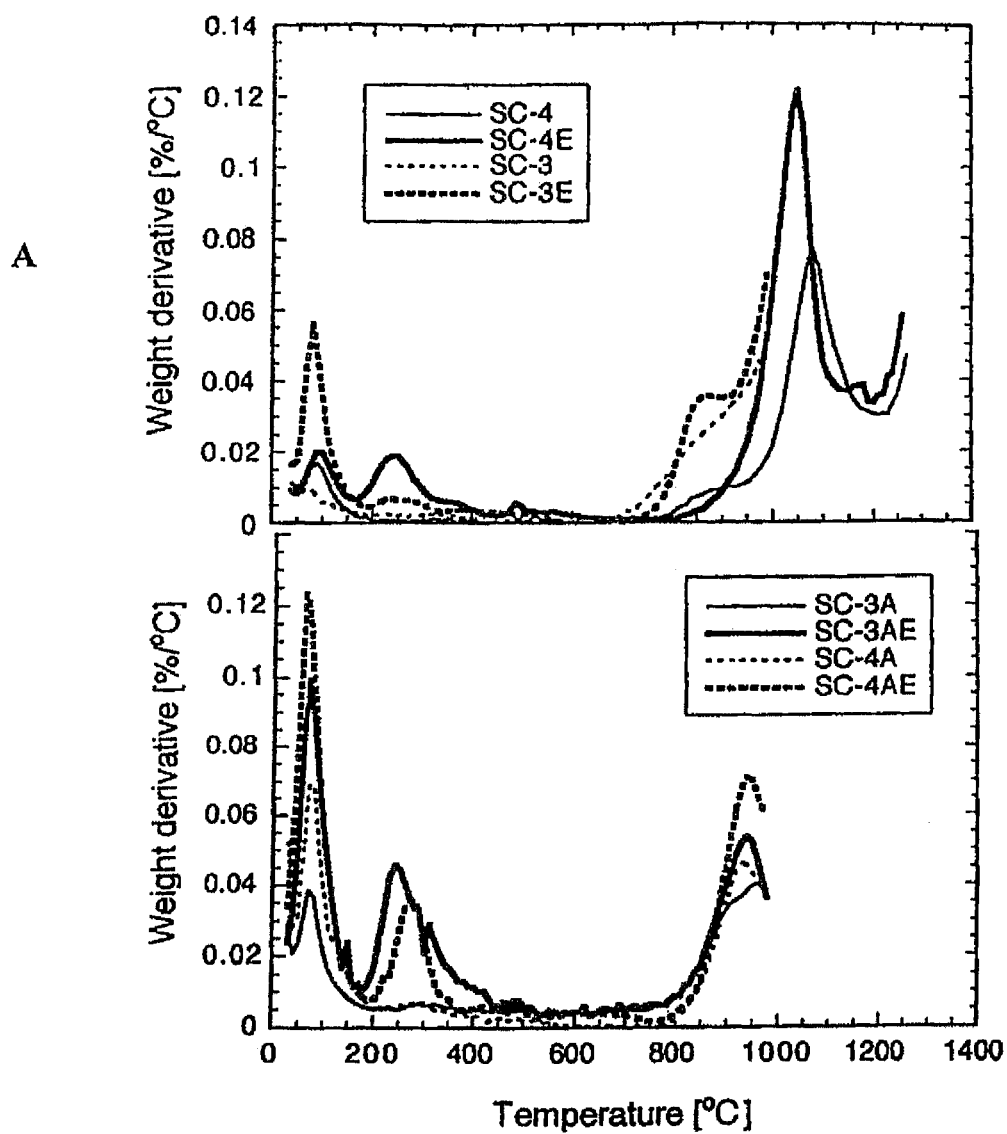

FIG. 14. DTG curves in nitrogen for the sludge-derived adsorbents and their acid-treated counterparts.

Figure 15:
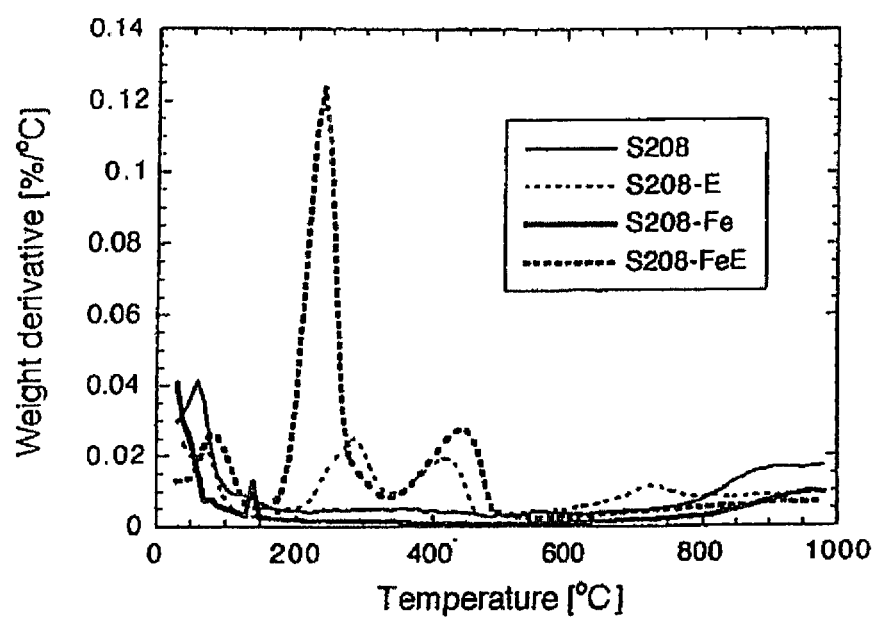

FIG. 15. DTG curves in nitrogen for the S208 series of samples.

Figure 16:
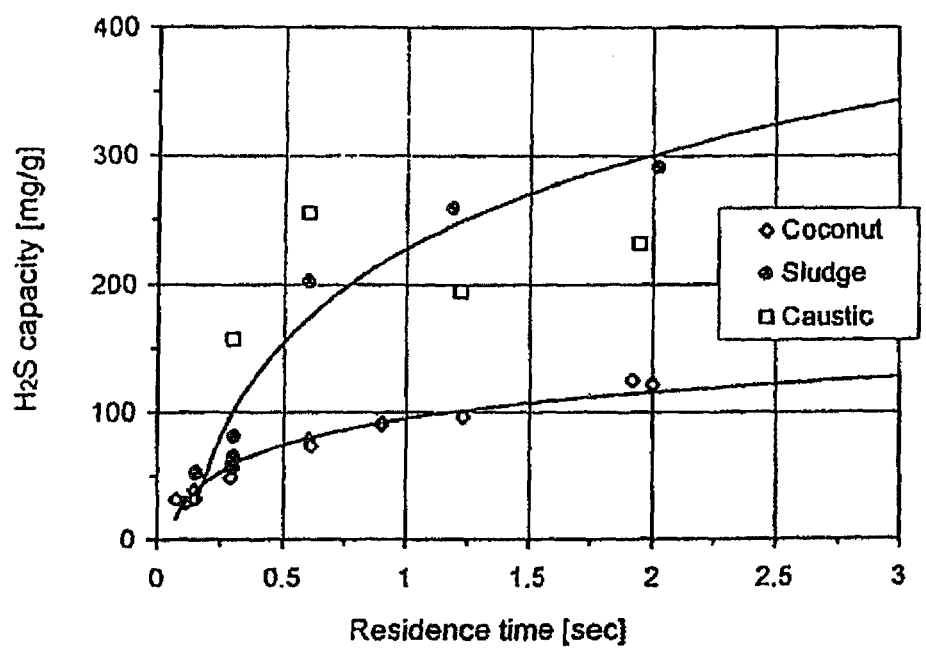

FIG. 16. Changes in capacity with an increase in residence time (bed depth) for sludge-derived sorbent (950° C.) and coconut-shell-based activated carbon (S208 from Barnabey and Sutcliffe). The capacity measured for caustic-impregnated carbon is marked as open boxes.

Figure 17:
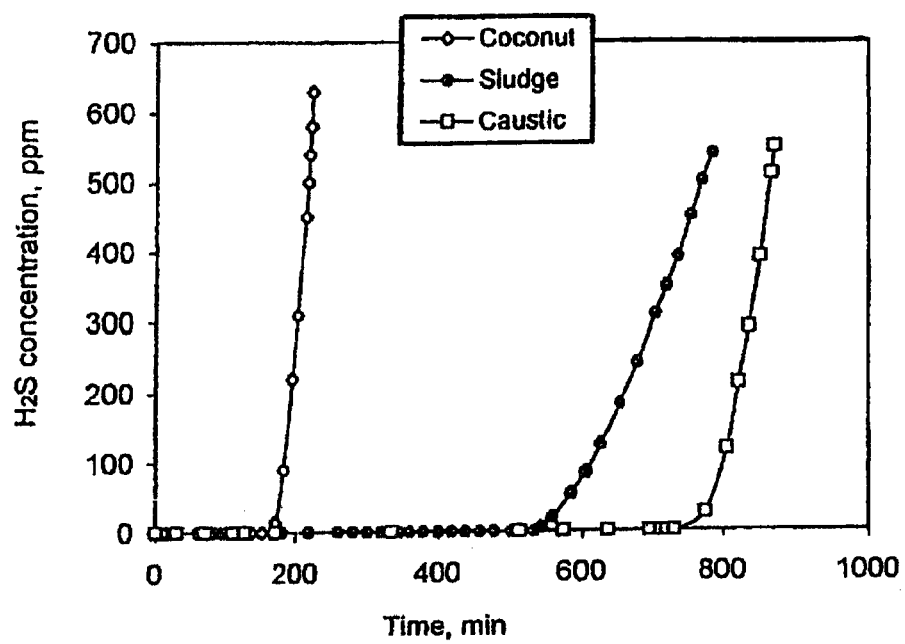

FIG. 17. $H_2S$ breakthrough curves for our sorbents and commercial carbons (12 mL bed).

5. DETAILED DESCRIPTION OF THE INVENTION

Some of the terms of the invention may be defined as follows.

Adsorption: The surface of a solid always accumulates molecules from its gaseous or liquid environment; this phenomenon is called adsorption.

Adsorbent: A material that is able to adsorb considerable amounts of gases or vapors under certain conditions.

Pyrolysis: Heat treatment (over 400° C.) in an inert atmosphere of materials having organic origin.

Activated carbon: A carbonaceous material obtained by pyrolysis of organic precursors (coal, wood, peat, etc.) at elevated temperatures followed by their activation using various physical or chemical agents (at temperatures between 600 and 1000° C.).

Caustic-impregnated carbon: Activated carbons impregnated with KOH or NaOH in order to increase their pH and adsorption capacity for acidic gases.

Breakthrough capacity: The amount of substance adsorbed on the sorbent surface until the substance is detected in effluent air at a certain concentration level.

Acidic gases: Gases able to be transformed into acids or gases able to interact as acids (electron acceptors).

Specific surface area: The surface area per unit weight of adsorbent considered to be the area where adsorption of various molecules can occur.

Pore volume: The volume of pores in adsorbent calculated as available to nitrogen molecules at its boiling point.

Oxidation: Change in the chemical stage of a substance associated with an electron loss. The charge on the species becomes more positive.

Residence time: An average time to be spent by reactant molecules in order to pass through the reactor.

This invention is directed to an adsorbent comprising: a) 20-30% porous carbon with incorporated organic nitrogen species; and b) 70-80% inorganic matter. In one embodiment, the inorganic matter includes highly dispersed catalytic oxides. In a further embodiment, the catalytic oxides are one or more of copper oxide, zinc oxide, iron oxide, calcium oxide, silica and alumina. In another embodiment, the nitrogen species comprises amine or pyridine groups. In one embodiment, the surface area of the adsorbent is 100-500 $m^2/g$. In a further embodiment, the surface area of the adsorbent is 100-200 $m^2/g$. In another embodiment, the adsorbent contains micropores and the volume of the micropores are at least 0.03 $cm^3/g$. In one embodiment, the pH of the adsorbent is greater than 10. In another embodiment, the pH of the adsorbent is between 7 and 10. In another embodiment, the pH of the adsorbent is between 4 and 7.

The adsorbents of this invention have several advantages:

1) Sorbents obtained from sewage sludge-derived organic fertilizer have two-fold higher capacity for hydrogen sulfide removal than unmodified carbons.
2) Their capacity is comparable to that of caustic-impregnated carbons used worldwide as hydrogen sulfide adsorbents in sewage treatment plants.
3) The kinetics of the removal process are very fast and no heat is released.
4) During adsorption $H_2S$ reacts with inorganic matter and is oxidized to elemental sulfur. The product is environmentally inert. The pH of the spent material is about 7 so it can be safely discarded.
5) Since the sorbents are obtained from sewage sludge the significant amount of municipal waste can be recycled and reused in sewage treatment plants.

6) The sorbents can be also used in desulfurization of gaseous fuel and in hydrothermal vents.
7) The sorbents can find another environmental application in removal of $SO_2$ in effluent gas from power plants.
8) The possibility exists of regeneration of spent materials using heating to 300° C. to remove elemental sulfur and sulfur dioxide.

This invention is further directed to a method of making an adsorbent which comprises: a) thermally drying dewatered sewage sludge to form granulated organic fertilizer; and b) pyrolyzing said the organic fertilizer at temperatures between 600 and 1000° C. In one embodiment, the heating rate is between 5 and 10° C./minute and the hold time is between 60 and 90 minutes. In a further embodiment, the temperature of pyrolysis is between 800 and 1000° C. In a further embodiment, the temperature of pyrolysis is between 900 and 1000° C. In a further embodiment, the temperature of pyrolysis is between 600 and 900° C. and the adsorbent is further treated with 15-20% HCl. In a further embodiment, the temperature of pyrolysis is between 800 and 900° C. The invention is additionally directed to an adsorbent formed by one of the above-identified methods.

The invention is directed to the process of removing acidic gases from wet air streams comprising putting an adsorbent comprising 20-30% porous carbon with incorporated organic nitrogen species and 70-80% inorganic matter in contact with the wet air stream and allowing the adsorbent to adsorb the acidic gases. In one embodiment, the acidic gases are one or more of hydrogen sulfide, sulfur dioxide, hydrogen cyanide, and nitrogen dioxide. In another embodiment, the acidic gas is hydrogen sulfide which reacts with inorganic matter to be oxidized to sulfur dioxide or elemental sulfur and salt forms thereof. In a further embodiment, the wet air stream is effluent from a sewage treatment plant, gaseous fuel, or gases from hydrothermal vents.

The invention is directed to the process of removing acidic gases from wet air streams comprising forming an adsorbent by thermally drying dewatered sewage sludge to form granulated organic fertilizer and pyrolyzing said organic fertilizer at temperatures between 600-1000° C., putting said adsorbent in contact with the wet air stream, and allowing the adsorbent to adsorb the acidic gases. In one embodiment, the acidic gases are one or more of hydrogen sulfide, sulfur dioxide, hydrogen cyanide, and nitrogen dioxide. In another embodiment, the temperature of pyrolysis is between 800 and 1000° C. In a further embodiment, the temperature of pyrolysis is between 900 and 1000° C. In another embodiment, the temperature of pyrolysis is between 600 and 900° C. and the adsorbent is further treated with 15-20% HCl. In another embodiment, the temperature of pyrolysis is between 800 and 900° C. In another embodiment, the adsorbent may be regenerated by heating to 300-500° C. to remove elemental sulfur and sulfur dioxide.

6. EXAMPLES

A. Materials (SLC-1, SLC-2, SLC-3, SLC-4, C-1, and C-3)

Terrene® was obtained from NYOFCo (New York Organic Fertilizer Company) in the form of 3 mm diameter granules with about 5% water content. (Terrene® is a registered trademark of Wheelabrator Clean Water Systems, Inc., Hampton, N.H.) The results of the chemical analysis (Pace Analytical Services) are presented in Table 1. The adsorbents studied were prepared by pyrolysis of Terrene® at temperatures between 400-950° C. in a nitrogen atmosphere in a fixed bed (horizontal furnace). The samples, experimental pyrolysis conditions, and adsorbent yield calculated as the weight ratio after and before pyrolysis are given in Table 2. To determine the effect of acid washing on the pore structure and chemistry of the organic carbonaceous phase, the SLC-1 and SLC-3 samples were subsequently treated with 16% hydrochloric acid to remove acid-soluble inorganic matter and then washed with distilled water to remove excess acid. The samples obtained in this way are designated as C-1 and C-3, respectively.

TABLE 1

Results of chemical analysis of Terrene ®

| Element/quantity | Content [ppm] |
|---|---|
| Aluminum | 7410 |
| Arsenic | 5.97 |
| Cadmium | 3.52 |
| Calcium | 20300 |
| Chromium | 73.2 |
| Cobalt | 10.2 |
| Copper | 932 |
| Iron | 26600 |
| Lead | 280 |
| Magnesium | 5550 |
| Molybdenum | 13.2 |
| Nickel | 44.6 |
| Potassium | 0.09 |
| Selenium | 6.09 |
| Silver | ND |
| Zinc | 1290 |
| Sulfur | 0.70% |
| Nitrogen | 1.82% |
| Phosphorus | 3.17% |
| pH | 7.08 |
| Bulk density | 0.78 g/cm$^3$ |
| Density | 1.21 g/cm$^3$ |
| Fixed solids | 65.3% |
| Volatile solids | 34.7% |

TABLE 2

Names of samples, conditions of preparation and yields of carbonaceous materials

| Sample name | Temperature [° C.] | Heating rate [deg/min] | Hold time [min] | Yield of adsorbents [%] | Ash content [%] | Yield of carbon. material [%] |
|---|---|---|---|---|---|---|
| SLC-1 | 400 | 10 | 30 | 51.9 | 61.7 | 19.9 |
| SLC-2 | 600 | 10 | 60 | 46.3 | 69.1 | 14.3 |
| SLC-3 | 800 | 10 | 60 | 41.8 | 76.8 | 9.7 |
| SLC-4 | 950 | 10 | 60 | 39.3 | 80.7 | 7.6 |
| Ash | 600 | 5 | 120 | 33.1 | — | — |

B. Materials (SC-1, SC-2, SC-3, SC-4, SC-2A, SC-3A, SC-4A, S208, S208-Fe and Derivatives)

Terrene® was obtained from the New York Organic Fertilizer Company, (Bronx, N.Y.) in the form of 3 mm diameter granules with about 5% water content. It contains around 35% inorganic matter mainly in the form of iron, alumina, silica oxides and carbonates. The adsorbents studied were prepared by pyrolysis of Terrene® at temperatures between 400-950° C. in a nitrogen atmosphere in a fixed bed (horizontal furnace). The samples are referred to as SC-1, SC-2, SC-3 and SC-4 where 1, 2, 3, and 4 represent the pyrolysis temperatures of 400, 600, 800 and 950° C., respectively. To determine the effect of metals such as iron, zinc and copper, the samples were treated with 18% hydrochloric acid for three days followed by washing with distilled water to remove excess HCl. The samples obtained in this way are designated as SC-2A, and SC-3A, and SC-4A. The filtrates were saved to determine the quantities of removed metals as described below.

For comparison, the experiments were done using the as-received carbon manufactured from coconut shells by Watelink Barnabey and Sutcliffe, S208. The sorbent is produced in the form of 6.4×3.2 mm pellets. To provide the same dynamic conditions of the experiment, S208 carbon was granulated and the fraction with the same size (1-3 mm) as the carbonized Terrene® was chosen for the breakthrough experiments.

To study the effect of iron, a 20 g subsample of the S208 carbon was impregnated with 40 ml ferric chloride (5%). The sample was then hydrolyzed in the presence of dilute sodium hydroxide, filtered, and dried. The material was then heated under the same conditions as SC-4 (950° C.). The sample is referred to as S208-Fe.

The breakthrough tests were also carried out on activated alumina (Alcoa®, $S_{BET}$=309 m$^2$/g, $V_t$=0.37 cm$^3$/g) as received and with iron oxides introduced in the same way as described above for S208-Fe. The samples are referred to as $Al_2O_3$ and $Al_2O_3$—Fe.

The prepared materials were studied as hydrogen sulfide adsorbents in the dynamic tests described below. After exhaustion of its adsorbent capacity, each sample is identified by adding the letter "E" to its designation.

C. Methods of Making Organic Fertilizer

The adsorbents of this invention may be made from any thermally dried dewatered biosolid, organic fertilizer, as a precursor. In one embodiment, Terrene® obtained from NYOFCo (New York Organic Fertilizer Company) in the form of 3 mm diameter granules with about 5% water content, may be used as the precursor to the adsorbent. Thermally dried dewatered biosolids may be made by the following general method (Wheelabrator Technologies, Inc.). Dewatered biosolids cake is mixed with recycled dry biosolids to produce a granular feed for dryers, such as rotary dryers. The resulting biosolids are dried to approximately five percent water content in the dryers. If a rotary dryer is used, the tumbling action of the dryers creates round pellets, which may be separated by size. Pellets of the desired size may be separated and undersized and crushed pellets may be recycled for use as recycled dried biosolids in the first step of producing granular feed for the dryers.

D. Methods of Studying Materials

Nitrogen Adsorption

Nitrogen adsorption isotherms were measured using an ASAP 2010 analyzer (Micromeritics, Norcross, Ga., USA) at −196° C. Before the experiment, the samples were degassed at 120° C. to constant pressure of $10^{-5}$ torr. The isotherms were used to calculate the specific surface area, $S_{N2}$ or $S_{DFT}$, micropore volume, $V_{mic}$; total pore volume, $V_t$; and pore size distribution. All the parameters were determined using Density Functional Theory (DFT) [Lastoskie C M, Gubbins K E, Quirke N. Pore size distribution analysis of microporous carbons: a density functional theory approach. J. Phys. Chem. 1993; 97: 4786-4796; Olivier J P. Modeling physical adsorption on porous and nonporous solids using density functional theory. J. Porous Materials 1995; 2: 9-17] and the Dubinin-Raduskevich (DR) method [Dubinin M M. In Chemistry and Physics of Carbon; Walker, P. L., Ed.; Vol.2. Marcel Dekker: New York, 1966; Jagiello J, Bandosz T J, Schwarz J A. Carbon surface characterization in terms of its acidity constant distribution Carbon 1994; 32: 1026-1028]. The relative microporosity was calculated as the ratio of micropore volume (DR) to total pore volume. In some cases, BET surface area, $S_{BET}$, and the total pore volume, $V_t$ (evaluated from the last point of the isotherm) were calculated.

Potentiometric Titration

Potentiometric titration measurements were performed with a DMS Titrino 716 automatic titrator (Metrohm, Brinkmann Instruments, Westbury, N.Y., USA). The instrument was set in the mode when the equilibrium pH was collected. Approximately 0.100 g samples were placed in a container thermostated at 298 K with 50 mL of 0.01M $NaNO_3$ and equilibrated overnight. To eliminate interference by $CO_2$, the suspension was continuously saturated with $N_2$. The carbon suspension was stirred throughout the measurement. The titrant was standardized 0.1 M NaOH. Experiments were carried out in the pH range 3-10 and the results were treated using a method used in the art [Jagiello J, Bandosz T J, Putyera K, Schwarz J A. Determination of proton affinity distributions for chemical systems in aqueous environments using stable numerical solution of the adsorption integral J. Coll. Interface Sci 1995; 172: 341-346; Bandosz T J, Buczek B, Grzybek T, Jagiello, J. Determination of surface changes in active carbons by potentiometric titration and water adsorption Fuel 1997; 76:1409-1417].

DRIFT

Diffuse reflectance IR spectra were obtained using a Nicolet Impact 410 FT-IR spectrometer equipped with a diffuse reflectance unit (Nicolet Instrument Corp., Madison, Wis., USA). Adsorbent carbon powders were placed in a micro-sample holder.

pH

A 0.4 g sample of dry adsorbent was added to 20 mL of water and the suspension stirred overnight to reach equilibrium. The sample was filtered and the pH of solution was measured using a Accumet Basic pH meter (Fisher Scientific, Springfield, N.J., USA).

Thermal Analysis

Thermal analysis was carried out using TA Instruments Thermal Analyzer (New Castle, Del., USA). The heating rate was 10° C./min in a nitrogen atmosphere at 100 mL/min flow rate. TGA is thermogravimetric analysis. DTA is differential thermal analysis. DTG is differential thermogravimetric analysis. TG is thermogravimetry.

CHN Analysis

Carbon, nitrogen and hydrogen analyses were performed by Huffman Laboratories, Golden, Colo., USA.

$H_2S$ Breakthrough Capacity

The dynamic tests were carried out at room temperature to evaluate the capacity of sorbents for $H_2S$ removal. Adsorbent samples were packed into a column (length 60 mm, diameter 9 mm, bed volume 6 cm$^3$) and prehumidified with moist air (relative humidity 80% at 25° C.) for an hour. The amount of adsorbed water was estimated from the increase in the sample weight. Moist air (relative humidity 80% at 25° C.) containing 0.3% (3000 ppm) $H_2S$ was then passed through the column of adsorbent at 0.5 L/min. The elution of $H_2S$ was monitored using an Interscan LD-17 $H_2S$ continuous monitor system interfaced with a computer data acquisition program. The test was stopped at the breakthrough concentration of 500 ppm. The adsorption capacities of each sorbent in terms of g of $H_2S$ per gram of carbon were calculated by integration of the area above the breakthrough curves, and from the $H_2S$ concentration in the inlet gas, flow rate, breakthrough time, and mass of sorbent.

Determination of Iron, Zinc and Copper

The quantities of iron, zinc and copper removed from sludge-derived adsorbents during acid treatment were determined using a Computrace 716 polarograph (Metrohm) in the differential pulse mode. 0.03 M triethanolamine was the electrolyte used for the determination of iron, whereas copper and zinc were determined using a 0.05M $NH_3/NH_4Cl$ buffer solution. In all cases, the standard addition method was applied with 1 mL sample and 10 mL supporting electrolyte. The differential pulse polarography peaks for iron, zinc and copper were at −1.04, −1.07, and −0.30 V vs. SCE, respectively.

E. Results and Discussion Concerning Materials SLC-1, SLC-2, SLC-3, SLC-4, C-1, and C-3

The analytical data in Table 1 shows the thermally-dried sludge pellets (Terrene®) have a high content of inorganic matter, especially metals such as iron and calcium, which can be beneficial in the catalytic oxidation of hydrogen sulfide [Katoh H., Kuniyoshi I., Hirai M., Shoda M. Studies of the oxidation mechanism of sulfur containing gases on wet activated carbon fibre. Appl. Cat. B: Environ. 1995;6: 255-262.]. As expected for this digested municipal sludge product, the organic nitrogen, phosphorus and sulfur content is also high. The analysis does not include carbon, but based on the results of previous studies, the total organic matter in the sludge product is expected to be about 70% (w/w) [Chiang, P C., You, J H. Use of sewage sludge for manufacturing adsorbents, Can. J. Chem. Eng. 1987; 65: 922-927; Lu, G Q, Low J C F, Liu C Y, Lau A C. Surface area development of sewage sludge during pyrolysis, Fuel 1995; 74: 3444-3448; Lu G Q, Lau D D. Characterization of sewage sludge-derived adsorbents for $H_2S$ removal. Part 2: surface and pore structural evolution in chemical activation. Gas Sep. Purif. 1996; 10: 103-111]. The ash content of the sample was evaluated using thermal analysis. The residue after heating the sludge pellets to 1000° C. is 31.4% of the initial sample mass, which is in agreement with previous studies [Chiang, P C., You, J H. Use of sewage sludge for manufacturing adsorbents, Can. J. Chem. Eng. 1987; 65: 922-927; Lu, G Q, Low J C F, Liu C Y, Lau A C. Surface area development of sewage sludge during pyrolysis, Fuel 1995; 74: 3444-3448; Lu G Q, Lau D D. Characterization of sewage sludge-derived adsorbents for $H_2S$ removal. Part 2: surface and pore structural evolution in chemical activation. Gas Sep. Purif. 1996; 10: 103-111]. About 80% of the ash is expected to consist of inorganic oxides such as $Al_2O_3$, $SiO_2$, $Fe_2O_3$ [Lu, G Q, Low J C F, Liu C Y, Lau A C. Surface area development of sewage sludge during pyrolysis, Fuel 1995; 74: 3444-3448].

The results of the thermal analysis of the sludge pellets in air and in nitrogen are presented in FIG. 1. The TGA curves in air and nitrogen are similar up to about 275° C. (FIGS. 1A and 1B). The first peak at about 125° C. is the result of the removal of water (around 4%). The weight loss observed between about 200° C. and 400° C. is the result of the emission of volatile organic compounds responsible for the strong unpleasant odor during carbonization. In air, the sharp decrease in weight at 275° C. correlates with the first, smaller DTA exotherm (FIG. 1C), caused by oxidation and/or volatilization of easily oxidized volatiles in the sludge pellets. The corresponding weight change in the nitrogen atmosphere maximizing at about 340° C. reflects volatilization of these compounds. A second, similar event is observed at about 425° C. More significant differences occur at temperatures greater than 450° C. In the air atmosphere, ignition of the carbonaceous material occurs as indicated by the sharp exotherm on the DTA and weight derivative curve on the TGA scan. The DTA curve in nitrogen (FIG. 1C) is almost featureless.

The weight losses clearly seen on the DTG curves in FIG. 1B are quantified in Table 3. The total yield of adsorbent is 39.1% with 80.3% content of ash. The yield of carbonaceous phase is up to 19.7%.

TABLE 3

Weight loss during thermal analysis of Terrene ® [%]

| Atmosphere | 30-200° C. | 200-500° C. | 500-1000° C. | Total | yield |
|---|---|---|---|---|---|
| nitrogen | 7.2 | 42.8 | 10.9 | 60.9 | 39.1 |
| air | 7.4 | 48.1 | 13.1 | 68.6 | 31.4 |

The results of the thermal analysis of Terrene® were used to choose the experimental conditions for the pyrolysis, and as shown in Table 2, 400, 600, 800 and 950° C. were chosen as pyrolysis temperatures. As expected, the yield of carbonaceous phase calculated from thermal analysis decreases with an increasing temperature of heat treatment, and ranges from 19.5% for SLC-1 to 7.6% for SLC-4.

The results of CHN analysis in Table 4, show that the sorbents obtained have about 30% carbonaceous material which is good for the development of the surface features responsible for physical adsorption. Also as expected, the sample SLC-1 has the highest content of nitrogen, almost 4%. With increasing carbonization temperature both the nitrogen and hydrogen contents decrease because of both loss of volatile species and increase in the degree of carbonization. Moreover, the organic nitrogen that is probably present as proteinaceous amine functionalities in the low temperature carbonized material is gradually transformed into pyridine-like compounds (see below) which should be reflected in increased basicity of the surface. After washing with hydrochloric acid % of carbon and nitrogen increase because of the partial removal of inorganic matter. It is worth noting that the nitrogen content of the C-3 sample increased 18% compared to its unwashed precursor, which may be beneficial for the application of this material as a sorbent for acidic gases. The dissolution of inorganic matter by acid treatment of SLC-1 and SLC-3 resulted in weight losses of 26% and 19%, respectively.

TABLE 4

Carbon, hydrogen, and nitrogen content [%] (elemental analysis).

| Sample | C | H | N |
|---|---|---|---|
| SLC-1 | 28.19 | 2.04 | 3.83 |
| SLC-2 | 27.14 | 1.14 | 3.19 |
| SLC-3 | 26.37 | 0.42 | 1.61 |
| SLC-4 | 24.89 | 0.35 | 0.94 |
| C-1 | 36.92 | 2.46 | 4.79 |
| C-3 | 31.97 | 0.63 | 1.90 |

The pore structure of adsorbents was determined using sorption of nitrogen at its boiling point. The adsorption isotherms are presented in FIG. 2. It is clearly seen that the total sorption uptake increases with increasing pyrolysis temperature. The isotherms are characteristic of predominantly mesoporous solids with some contribution by the micropores. The surface areas and pore volumes calculated using the DR and DFT methods are given in Table 5. The surface area increases by a factor of almost three as the pyrolysis temperature is increased from 400 to 950° C. The biggest difference exists between SLC-1 and SLC-2 suggesting that significant development of the porosity occurs between 400 and 600° C. Similar changes are observed for micropore volumes, which reach 0.051 $cm^3/g$ for SLC-4 (DR method). The relative microporosity, defined as the ratio of the volume of micropores to total pore volume, is almost constant for the samples heated to temperatures higher than 600° C. Its values near 30% indicate a significant contribution of mesoporosity in the sludge-derived adsorbents. The mesopores may have their origin in the high (~80%) content of inorganic matter, which consists mainly of silica, alumina, and iron oxides [Jagiello J, Bandosz T J, Putyera K, Schwarz J A. Determination of proton affinity distributions for chemical systems in aqueous environments using stable numerical solution of the adsorption integral. J. Coll. Interface Sci 1995; 172: 341-346]. To determine the contribution of the mesopores, the adsorption isotherms were measured on the ash obtained after heating the sample in air at 600° C. (FIG. 2). The ash surface area is quite small which reflects the presence mainly of mesopores (Table 5). The development of porosity with increasing pyrolysis temperature is demonstrated in FIG. 3.

TABLE 5

Structural parameters calculated from nitrogen adsorption isotherms.

| Sample | $S_{BET}$ [m²/g] | $V_{mic}$(DR) [cm³/g] | $S_{mic}$(DR) [m²/g] | $S_{DFT}$ [m²/g] | $V_{mic}$(DFT) [cm³/g] | $V_t(0.99^*)$ [cm³/g] | $V_{mic}/V_t$ |
|---|---|---|---|---|---|---|---|
| SLC-1 | 41 | 0.016 | 35 | 21 | 0.006 | 0.084 | 0.19 |
| SLC-2 | 99 | 0.044 | 108 | 92 | 0.030 | 0.131 | 0.33 |
| SLC-3 | 104 | 0.048 | 118 | 106 | 0.033 | 0.132 | 0.36 |
| SLC-4 | 122 | 0.051 | 120 | 104 | 0.028 | 0.158 | 0.32 |
| C-1 | 17 | 0.006 | 13 | 15 | 0.002 | 0.063 | 0.09 |
| C-3 | 139 | 0.058 | 135 | 150 | 0.030 | 0.201 | 0.29 |
| Ash | 20 | 0.008 | 17 | 13 | 0.003 | 0.077 | 0.10 |

The pore size distributions (PSDs) calculated for our materials using density functional theory [Lastoskie C M, Gubbins K E, Quirke N. Pore size distribution analysis of microporous carbons: a density functional theory approach. J. Phys. Chem. 1993; 97: 4786-4796; Olivier J P. Modeling physical adsorption on porous and nonporous solids using density functional theory. J. Porous Materials 1995; 2: 9-17] are shown in FIGS. 4 and 5. The development of micropores (smaller than 20 Å) is observed with increasing carbonization temperature. Moreover, the volume of mesopores smaller than 100 Å significantly increases with temperature as a result of chemical changes in the inorganic matter and carbon-inorganic matter interface. These PSDs also confirm our hypothesis about the source of the mesoporosity being the inorganic matter. FIG. 5 shows the changes in the distribution of pore sizes for samples before and after acid washing. For the sample carbonized at 400° C., a significant decrease in the volume of pores of all sizes is observed on acid washing, a result of the chemical reactivity of this sample. After pyrolysis at low temperature both organic and inorganic structures have a high reactivity toward acids resulting in a significant change in the physical state of the material. On the other hand, for the sludge pellet sample treated at 800° C., acid washing produces a significant increase in the volume of micro- and small mesopores along with a decrease in the volume of mesopores. It is likely that acid washing removes species such as iron oxides, creating new pores within the inorganic matter and at the interface between the inorganic and organic phases. An increase in the total porosity is also a result of the increasing contribution of the carbonaceous material in this sample.

All the structural parameters reported in Table 5 are much smaller than those for commercial activated carbons [Bansal R C, Donnet J B, Stoeckli F. Active Carbon; Marcel Dekker: New York, 1988]. Considering that our sorbents contain 25 to 30% carbon, the porous structure responsible for an increase in the surface area has to be developed within this organic deposit. Since a higher pore volume is generated simultaneously with lower carbon content, the increase in pyrolysis temperature must produce subtle chemical changes resulting in gasification of carbon and creation of more pore volume. The small peaks in the DTG curves at 700° C. and 800° C. may reflect these changes. The chemical changes may be related to an increase in the degree of aromatization and the incorporation of nitrogen and other heteroatoms into the carbon matrix [Adib F, Bagreev A, Bandosz T J. Adsorption/oxidation of hydrogen sulfide on nitrogen modified activated carbons. Langmuir 2000; 16: 1980-1986.; Stohr B, Boehm H P. Enhancement of the catalytic activity of activated carbons in oxidation reactions by thermal treatment with ammonia of hydrogen cyanide and observation of a superoxide species as a possible intermediate. Carbon 1991; 29, 707-720; Schmiers H, Friebel J, Streubel P, Hesse R, Kopsel R. Change of chemical bonding of nitrogen of polymeric n-heterocyclic compounds during pyrolysis. Carbon 1999; 37: 1965-1978]. Moreover, water released from dehydroxylation of inorganic material can act as a pore former and activation agent creating very small (Angstrom-size) pores in the carbon deposit [Bandosz T J, Putyera K, Jagiello J, Schwarz J A. Study of carbon smectite composites and carbons obtained by in situ carbonization of polyfurfuryl alcohol. Carbon 1994; 32, 659-664; Bandosz T J, Jagiello J, Putyera K, Schwarz J A. Sieving properties of carbons obtained by template carbonization of polyfurfuryl alcohol within mineral matrices. Langmuir 1995; 11: 3964 - 3969; Bandosz T J, Jagiello J, Putyera K, Schwarz J A. Pore structure of carbon-mineral nanocomposites and derived carbons obtained by template carbonization. Chem. Mat. 1996; 8: 2023-2029].

The suggested chemical changes described above reflected first in the pH values of the adsorbents (Table 6). It is interesting that the pH of the sample SLC-1 is close to neutral and that pyrolysis at higher temperatures causes a significant increase in the pH values to greater than pH 11. The pH of the ash sample is also close to neutral. Since the dehydroxylation of inorganic species is expected to occur at around 400° C. [Barrer R M. Zeolites and Clay Minerals as Sorbents and Molecular Sieves: Academic Press; London 1978] an increase of 3.8 pH units between SLC-1 and SLC-2 must be related to chemical changes in the carbon phase. These samples have high organic nitrogen contents. When the pyrolysis temperature is higher than 600° C. this nitrogen is probably incorporated into the carbon matrix as heteroatoms such as pyridine-like structures [Adib F, Bagreev A, Bandosz T J. Adsorption/oxidation of hydrogen sulfide on nitrogen modified activated carbons. Langmuir 2000; 16: 1980-1986.; Stohr B, Boehm H P. Enhancement of the catalytic activity of activated carbons in oxidation reactions by thermal treatment with ammonia of hydrogen cyanide and observation of a superoxide species as a possible intermediate. Carbon 1991; 29, 707-720; Schmiers H, Friebel J, Streubel P, Hesse R, Kopsel R. Change of chemical bonding of nitrogen of polymeric n-heterocyclic compounds during pyrolysis. Carbon 1999; 37: 1965-1978]. The basicity of these centers contributes to the high pH of the sludge-derived adsorbents.

TABLE 6 pH values of adsorbents' surface.

| Sample | pH |
|--------|-------|
| SLC-1  | 7.72  |
| SLC-2  | 11.51 |
| SLC-3  | 11.29 |
| SLC-4  | 10.96 |
| Ash    | 8.27  |

Changes in the surface chemistry were further studied using potentiometric titrations. The procedure applied and the mathematical treatment of the data [Jagiello J, Bandosz T J, Schwarz J A. Carbon surface characterization in terms of its acidity constant distribution Carbon 1994; 32: 1026-1028; Jagiello J, Bandosz T J, Putyera K, Schwarz J A. Determination of proton affinity distributions for chemical systems in aqueous environments using stable numerical solution of the adsorption integral. J. Coll. Interface Sci 1995; 172: 341-346; Bandosz T J, Buczek B, Grzybek T, Jagiello, J. Determination of surface changes in active carbons by potentiometric titration and water adsorption Fuel 1997; 76:1409-1417; Bandosz T J, Jagiello J, Schwarz J A., Surface acidity of pillared taeniolites in terms of their proton affinity distributions J. Phys.Chem. 1995; 99, 13522-13527] yields the distributions of acidity constants. The results are presented in FIG. 6. Comparisons of the peak intensities and peak positions indicate the predominant effect of the inorganic matrix on the acidity of the samples. The peaks for the high temperature sludge-derived samples are similar to those present in ash. Heat treatment results in changes in the acidity due to dehydroxylation of inorganic matter and rearrangement in coordination of such metals as alumina or iron [Bandosz T J, Jagiello J, Schwarz J A., Surface acidity of pillared taeniolites in terms of their proton affinity distributions J. Phys.Chem. 1995; 99, 13522-13527; Bandosz T J, Cheng K. Changes in acidity of Fe pillared/delaminated smectites on heat treatment J. Colloid Interface Sci., 1997; 191: 456-463; Lu, G Q, Low J C F, Liu C Y, Lau A C. Surface area development of sewage sludge during pyrolysis, Fuel 1995; 74: 3444-3448]. It is interesting that the sample carbonized at 600° C., SLC-2, differs significantly in acidity from the other samples. This is not consistent with the pH values in Table 6. The reason for the discrepancy may lie in a limitation of the potentiometric titration method, which is able to detect species having pKa's between 3 and 11. Species present with pKa's beyond the experimental window will affect the average pH of the sample. In the case of SLC-2 is likely the significant in inorganic/organic phase occur at the temperature, which also results in a significant increase in the porosity evaluated from nitrogen adsorption Comparison of the pKa distributions for SLC-1 and SLC-3 reveals differences in the peak intensities of peak at pKa's of approximately 3.5, 8.6, and 5.5. At the higher carbonization temperature the number of species having pKa's near 5.5 significantly decreased relative to the species with pKa's near 3.5 or 8.6. The observed effect is related to the changes in the acidity of inorganic oxides. After acid washing the distributions become more consistent with each other except for the peak at pKa near 7. In the case of C-1 this peak almost disappears whereas in C-3 the amount of detected species is much lower than for SLC-3. The peak probably represents soluble iron oxides [Bandosz T J, Cheng K. Changes in acidity of Fe pillared/delaminated smectites on heat treatment J. Colloid Interface Sci., 1997; 191: 456-463]. In C-1 these decreased about 97% vs. a decrease of about 62% for C-3, relative to the non-acid washed material.

The surface chemistry of the sewage sludge-derived samples was also studied using DRIFT. The results are presented in FIGS. 7 and 8. In the spectra obtained for the sludge-derived samples carbonized at the lowest temperature, the well-defined features of the inorganic matter are seen. For higher carbonization temperatures the spectra become more similar to those characteristic of activated carbons, reflecting the combined effects of the "screening" action of carbon, dehydroxylation of the mineral matter and possible phase transitions. Washing with acid changes the chemistry which is reflected in changes in the relative intensities of peaks. The distinctive feature of the low temperature carbonized samples, SLC-1 and C-1 is the presence of a peak between 2750 and 3000 $cm^{-1}$ which likely represents the nitrogen in amine functionalities. If as suggested above amine nitrogen is converted into pyridine form at high temperatures, peaks around 1575 $cm^{-1}$ should be apparent [The Sandtler Handbook of Infrared Spectral. Simons W W, Ed., Sandtler Research Laboratories, Inc. 1978]. Although in the spectra for our samples this peak is present we can not rule out other species such as —COO— bonds [Bandosz T J, Lin C, Ritter J A. Porosity and surface acidity of $SiO_2$—$Al_2O_3$ J.Coll. Interface Sci. 1998; 198: 347-353 ] which absorb in this region.

Significant changes in the chemical and physical nature of carbon-mineral sorbents are obtained by pyrolysis of a thermally-dried sewage sludge fertilizer product, Terrene®. Sorbents having surface areas up to 140 $m^2/g$ can be derived using a simple carbonization method. The materials have broad pore distributions with about 30% of total pore volume in very small micropores. The unique surface chemistry results from a combination of acidity from metal oxides such as silica, alumina, or iron, and basicity from organic nitrogen in the form of amine or pyridine-like groups. The presence of basic nitrogen and iron can hold significant advantages for the application of these materials as sorbents for acidic gases.

F. Results and Discussion Concerning Materials SC-1, SC-2, SC-3, SC-4, SC-2A, SC-3A, SC-4A, S208, S208-Fe and Derivatives The $H_2S$ breakthrough curves for our samples before and after acid treatment are shown in FIGS. 9A and 9B. For comparison, FIG. 10 shows the curves obtained for coconut shell-based activated carbon, as received and after impregnation with iron. The calculated capacities are summarized in Table 7. It is clearly seen that with increasing pyrolysis temperature the capacity of the sludge-derived adsorbents is significantly increased. It is remarkable that the capacity of the sample treated at 950° C., SC-4, is twice that of the as received activated carbon. After acid treatment, the breakthrough time of SC-4A decreased around 30% whereas for SC-2A and SC-3A an increase was found. The breakthrough curve for the latter sample resembles the curve obtained for SC-4A. Indeed their calculated capacities are comparable. In spite of the observed decrease in the performance of the acid treated sample carbonized at 950° C., removal of inorganic oxides generally increased the capacities of the samples carbonized at low temperature. It also changed the surface acidity. The initial materials are mainly basic. After acid washing their pH decreased to about 3, which may be related to the removal of basic oxides and to the strong adsorption of hydrochloric acid in the small pores. The ability of samples to retain water is also altered. After acid treatment twice as much water was adsorbed on the surface. As indicated elsewhere [Hedden, K.; Huber. L.; Rao, B. R. VDI Bericht 1976, 37, 253], the presence of water on activated carbons enhances the dissociation of hydrogen sulfide and facilitates to its oxidation to sulfur and sulfur dioxide [Adib, F.; Bagreev, A.; Bandosz, T. J. Environ. Sci. Technol. 2000, 34, 686; Hedden, K.; Huber. L.; Rao, B. R. VDI Bericht 1976, 37, 253; Adib, F.; Bagreev, A.; Bandosz, T. J. J. Coll. Interface Sci. 1999, 214, 407; Adib, F.; Bagreev, A.; Bandosz, T. J J. Coll. Interface Sci. 1999, 216, 360]. In the case of the sludge-derived materials, the mechanism of hydrogen sulfide removal probably differs from that for activated carbons. For the activated carbons, the significant decrease in the adsorption capacity corresponding to exhaustion is usually caused by the formation of sulfuric acid [Adib, F.; Bagreev, A.; Bandosz, T. J. Environ. Sci. Technol. 2000, 34, 686; Adib, F.; Bagreev, A.; Bandosz, T. J J. Coll. Interface Sci. 1999, 216, 360]. For the sludge-derived samples, only a small decrease in pH is observed and after exhaustion the materials preserve their basic pH. As was pointed out elsewhere [Adib, F.; Bagreev, A.; Bandosz, T. J. Environ. Sci. Technol. 2000, 34, 686; Adib, F.; Bagreev, A.; Bandosz, T. J. J. Coll. Interface Sci. 1999, 214, 407; Adib, F.; Bagreev, A.; Bandosz, T. J J. Coll. Interface Sci. 1999, 216, 360], for conventional carbons, basic initial pH favors the formation of elemental and polymeric sulfur as the final products of oxidation; there is a threshold pH below which this process becomes infeasible. However, this rule probably does not apply to our sludge-derived materials. For acid treated samples, even at very low pH, the capacity is still significant. Also noteworthy is the decrease in pH after exhaustion, which suggests formation of sulfuric acid [Adib, F.; Bagreev, A.; Bandosz, T. J. *Environ. Sci. Technol.* 2000, 34, 686; Adib, F.; Bagreev, A.; Bandosz, T. J J. Coll. Interface Sci. 1999, 216, 360; Adib, F.; Bagreev, A.; Bandosz, T. J. Langmuir 2000, 16, 1980]. These differences indicate that the mechanisms of hydrogen sulfide removal on initial and acid treated samples differ from each other. The differences are probably caused by the catalytic effect of inorganic matter [Katoh, H.; Kuniyoshi, I.; Hirai, M.; Shoda, M. Appl. Cat. B: Environ. 1995, 6, 255; Stejns, M.; Mars, P. Ind. Eng. Chem. Prod. Res. Dev. 1977, 16, 35; Cariaso, O. C.;Walker, P. L. Carbon 1975, 13, 233]. The possibility of chemisorption in the process of $H_2S$ removal on sludge-derived carbon was also pointed out by Lu and Lou; however, the capacity of their adsorbent was reported to be only 25% of that of activated carbon chosen for a comparison [Lu, G. Q.; Lau, D. D. Gas Sep. Purif. 1996, 10, 103]. A remarkably good performance of the SC-4 carbon as a hydrogen sulfide adsorbent also indicates that differences in the mechanisms of the process exist within the series of materials, probably attributable to changes in their chemical and structural composition.

TABLE 7 pH of the materials studied, their $H_2S$ breakthrough capacities, and the quantity of water adsorbed during prehumidification.

| Sample | pH | $H_2S$ breakthrough capacity (mg/g) | Water adsorbed (mg/g) |
| --- | --- | --- | --- |
| SC-1 | 7.9 | 8.2 | 60 |
| SC-1E | 7.5 | — | — |
| SC-2 | 11.4 | 14.9 | 40 |
| SC-2E | 9.2 | — | — |
| SC-3 | 11.2 | 23.6 | 48 |
| SC-3E | 8.8 | — | — |
| SC-4 | 10.8 | 82.6 | 62 |
| SC-4E | 9.9 | — | — |
| SC-2A | 2.8 | 21.2 | 106 |
| SC-2AE | 2.5 | — | — |
| SC-3A | 4.0 | 62.3 | 94 |

TABLE 7-continued pH of the materials studied, their $H_2S$ breakthrough capacities, and the quantity of water adsorbed during prehumidification.

| Sample | pH | $H_2S$ breakthrough capacity (mg/g) | Water adsorbed (mg/g) |
| --- | --- | --- | --- |
| SC-3AE | 2.3 | — | — |
| SC-4A | 3.8 | 57.5 | 100 |
| SC-4AE | 2.7 | — | — |
| S208 | 10 | 48.8 | 77 |
| S208E | 7.4 | — | — |
| S208-Fe | 7.4 | 104.5 | 165 |
| S208-FeE | 2.0 | — | — |
| $Al_2O_3$ | 8 | 0 | 30 |
| $Al_2O_3$-E | — | — | — |
| $Al_2O_3$—Fe | 8 | 6.5 | 23 |
| $Al_2O_3$—FeE | — | — | — |

Since the sludge-derived materials are rich in catalytic metals such as iron, zinc, copper, and aluminum oxides (Chiang, P. C.; You, J. H. Can. J. Chem. Eng. 1987, 65, 922) the differences in the performance of adsorbents before and after acid treatment are probably related to the presence of these metals in various forms, depending on the temperature treatment. Table 8 shows that the weight of the samples decreased between 20 to 30% after acid treatment. This is related to the removal of a significant amount of inorganic oxides. Even though acid treatment was done under the same conditions for all samples, the sample heated at 950° C. seems to be the most acid resistant. It is possible that heating at 950° C. resulted in the formation of mineral-like compounds with very high dispersion of catalytically active metal oxides. The effects of acid treatment on the content of iron, zinc and copper are summarized in Table 8. Metal contents in the initial materials were calculated based on ICP analyses. The data indicate that almost all iron was removed after treatment, while zinc and copper were removed only partially. It is interesting that the efficiency of the process decreased with increasing heat treatment temperature which supports our hypothesis about the formation of mineral-like structures in the case of sample SC-4. Only a very small percentage of copper and zinc were removed from this sample. Nevertheless, even after removal of all iron the capacities of SC-2A and SC-3A increased. This may be related to the changes in the dispersion of catalytically active metals (other than iron) resulting from reactions of oxides with acid, and an increase in the sample porosity [Adib, F.; Bagreev, A.; Bandosz, T. J. Langmuir 2000, 16, 1980; Stejns, M.; Mars, P. Ind. Eng. Chem. Prod. Res. Dev. 1977, 16, 35].

TABLE 8

Weight loss as a result of acid treatment, content of iron, zinc, and copper in the sludge derived materials (mg/g).

| Sample | Weight loss(%) | Fe | Zn | Cu |
| --- | --- | --- | --- | --- |
| SC-2 | | 58 | 2.79 | 2.01 |
| SC-2A | 27 | 0 | 1.75 | 0.52 |
| SC-3 | | 64 | 3.09 | 2.22 |
| SC-3A | 25 | 0 | 2.23 | 1.79 |
| SC-4 | | 68 | 3.28 | 2.37 |
| SC-4A | 19 | 5 | 3.15 | 2.89 |

Since the capacity of SC-4A decreased after acid treatment and removal of iron, the effect of this metal on the adsorption/oxidation of hydrogen sulfide on activated alumina and coconut shell-based carbon were studied. The results are given in Table 7. For both adsorbents, after impregnation with iron oxide the capacity for $H_2S$ adsorption/oxidation increased significantly. In the absence of iron, activated alumina was not able to immobilize any hydrogen sulfide. After impregnation and exposure to $H_2S$ for a short time, the surface changed color from orange-brown to black suggesting the presence of iron sulfide. Interesting results were obtained for the iron oxide-impregnated coconut shell-based carbon. The capacity increased significantly to a level slightly higher than the capacity of the sludge-derived adsorbent, SC-4. This increase in the $H_2S$ removal capacity upon impregnation of carbons with metal oxides capable of creating stable sulfides is not unexpected. Impregnation is well known in the activated carbon industry as a method to increase the performance of materials [Radovic, L. R.; Sudhakar, Ch. In Introduction to Carbon Technologies, Marsh, H; Heintz, E. A.; Rodriguez-Reinoso, F. (Eds.) University of Alicante, Alicante, Spain, 1997, p 103]. It is worth pointing out here that after this treatment the performance of the coconut shell-based carbon is only slightly better than that of SC-4, and that the breakthrough curves (FIG. 10) are very similar. Nevertheless, the differences between the two materials must lie in the products of oxidation. While the surface pH of exhausted SC-4E decreased only slightly, that of S208-FeE became very acidic suggesting a significant quantity of sulfuric acid adsorbed on the carbon surface [Adib, F.; Bagreev, A.; Bandosz, T. J. Environ. Sci. Technol. 2000, 34, 686; Adib, F.; Bagreev, A.; Bandosz, T. J. Langmuir 2000, 16, 1980].

The demonstration of the superiority of the performance of the sludge-derived adsorbents would not be complete without the detailed analysis of the pore structure and its comparison to coconut shell based activated carbon. Structural parameters calculated from nitrogen adsorption isotherms are given in Table 9. The surface area and pore volumes increase with increasing carbonization temperature. It is noteworthy that there are no significant differences in the porosity of SC-3 and SC-4 which could explain the differences in their $H_2S$ adsorption capacity. This supports our hypothesis that significant changes in surface chemistry favorable to $H_2S$ chemisorption occur when the sludge is pyrolyzed at 950° C.

TABLE 9

Structural parameters calculated from nitrogen adsorption isotherms and estimated hypothetical sulfur volume (assuming density equal to 2 $g/cm^3$).

| Sample | $S_{BET}$ ($m^2/g$) | $S_{DFT}$ ($m^2/g$) | $V_{mic}$ ($cm^3/g$) | $V_t$ (0.995*) ($cm^3/g$) | $V_{mic}/V_t$ | $\Delta V_{mic}$ ($cm^3/g$) | $\Delta V_t$ ($cm^3/g$) | $V_{sulf}$ ($cm^3/g$) |
|---|---|---|---|---|---|---|---|---|
| SC-1 | 41 | 21 | 0.006 | 0.075 | 0.080 | | | |
| SC-1E | 12 | 8 | 0.003 | 0.057 | 0.053 | 0.003 | 0.018 | 0.004 |
| SC-2 | 99 | 92 | 0.030 | 0.115 | 0.261 | | | |
| SC-2E | 14 | 9 | 0.001 | 0.040 | 0.025 | 0.029 | 0.075 | 0.007 |
| SC-3 | 104 | 106 | 0.033 | 0.107 | 0.308 | | | |
| SC-3E | 14 | 9 | 0.003 | 0.064 | 0.047 | 0.030 | 0.043 | 0.013 |
| SC-4 | 122 | 104 | 0.028 | 0.100 | 0.280 | | | |
| SC-4E | 21 | 13 | 0.002 | 0.065 | 0.031 | 0.026 | 0.035 | 0.039 |
| SC-2A | 186 | 181 | 0.039 | 0.107 | 0.364 | | | |
| SC-2AE | 15 | 12 | 0.002 | 0.011 | 0.181 | 0.037 | 0.096 | 0.010 |
| SC-3A | 193 | 196 | 0.040 | 0.113 | 0.354 | | | |
| SC-3AE | 8 | 8 | 0.001 | 0.011 | 0.090 | 0.039 | 0.102 | 0.029 |
| SC-4A | 181 | 183 | 0.042 | 0.119 | 0.352 | | | |
| SC-4AE | 86 | 95 | 0.018 | 0.085 | 0.212 | 0.024 | 0.034 | 0.027 |
| S208 | 880 | 889 | 0.359 | 0.457 | 0.786 | | | |
| S208E | 781 | 774 | 0.352 | 0.414 | 0.850 | 0.070 | 0.043 | 0.023 |
| S208-Fe | 933 | 932 | 0.406 | 0.498 | 0.815 | | | |
| S208-FeE | 560 | 528 | 0.243 | 0.294 | 0.827 | 0.163 | 0.204 | 0.049 |

*at the relative pressure $p/p_o$ equal to 0.995.

After H$_2$S adsorption/oxidation, the surface areas and pore volumes significantly decreased. This decrease is especially apparent in the volume of micropores indicating that they are active in the adsorption/oxidation process. Assuming that sulfur is the oxidation product deposited in these pores, the volume of deposited sulfur (density assumed to be 2 g/cm$^3$) can be calculated based on the amount of hydrogen sulfide adsorbed. The values are presented in Table 9 as V$_{sulf}$. For samples obtained at 800° C. and lower temperatures the volume of sulfur is much smaller than the decrease in the pore volume suggesting either the blockage of the pore entrances or the presence of other sulfur compounds such as sulfides on the surface. On the other hand, for the SC-4E sample the decrease in the micropore volume (and the total pore volume) is less than the calculated volume of sulfur. This indicates not only that all the pores of this material are completely filled with sulfur but that sulfur must be also chemisorbed on the surface in the form of chemical compounds.

As shown in Table 9, after acid treatment the surface area and pore volumes increased almost 100%. This may contribute to the observed increase in the H$_2$S breakthrough capacity of SC-2 and SC-3. Changes in the structural parameters upon exhaustion follow the trend observed for the initial samples. The only apparent difference is in the behavior of the SC-4AE sample, which lost only 50% of the surface area and micropore volume (compared to SC-4A) and which has a calculated sulfur volume smaller than the total decrease in the pore volume. In fact the value of V$_{sulf}$ is almost equal to a decrease in the volume of micropores, $\Delta V_{mic}$, which suggests deposition of sulfur in pores smaller than 20 Å. This apparent change in the mechanism of sulfur immobilization is probably caused by the removal of iron and other catalytically active metals, which prevents chemisorption and the formation of new compounds. Differences in the relative microporosity expressed as the ratio of the volume of micropores to the total pore volume further support differences in the immobilization mechanism between SC-3A and SC-4A. Although for both samples the quantities of adsorbed hydrogen sulfide are similar the relative microporosity decreased only 40% for the latter sample vs. about 75% for the SC-3A. Once again this suggests that sulfur species deposit at the pore entrances of SC-3A blocking their accessibility for the adsorption process.

Differences in the mechanism of the hydrogen sulfide immobilization before and after impregnation with iron are seen from an analysis of the structural parameters obtained for the coconut shell-based samples (Table 9). It is interesting that the surface area and pore volumes slightly increased after impregnation with iron oxide, suggesting a contribution of the iron deposit to porosity development. After H$_2$S adsorption on the initial sample, the volume of micropores decreased only 0.007 cm$^3$/g, much less than the calculated volume of sulfur deposited on this carbon (0.023 cm$^3$/g). This finding indicates that in this case sulfur is adsorbed in the mesopores. After treatment with iron a significant decrease in the volume of micropores is found. Since this decrease is almost three times larger than the calculated volume of sulfur, the deposited species must block the entrances to the micropores as was observed for some sludge-derived samples.

Detailed changes in microporosity caused by hydrogen sulfide adsorption/oxidation are seen from the analysis of the pore size distributions (PSD) presented in FIG. 11. PSD's were calculated using density functional theory [Lastoskie, C. M.; Gubbins, K. E.; Quirke, N. J. Phys. Chem. 1993, 97, 4786; Olivier, J. P. J. Porous Materials 1995, 2, 9]. For the initial samples, development of small pores is observed with increasing heat treatment temperature. All the sludge-derived samples have a significant development of mesoporosity as a result of the presence of inorganic matter. It is probable that microporosity exists in the carbonaceous deposit (around 30% of total mass of the adsorbent) or/and on the interface between carbon and inorganic matter. It is clearly seen that after H$_2$S adsorption almost all the micropores disappear; the volume of mesopores decreased but not as drastically as the volume of micropores. A similar result is found for the acid-treated samples. As a result of the removal of inorganic matter (around 25% by weight) the contribution of the carbonaceous material to the total mass of the adsorbent increased, increasing the volume of the micropores. Mesopores, however present, are not so dominant as in the case of the initial materials. After adsorption, nearly all the pores disappear for all samples except SC-4A. This indicates that the pore entrances are blocked by the adsorption/oxidation products. In the case of SC-4E, it is mainly the pores smaller than 50 Å that are affected. Although the volume of small pores is still available to nitrogen molecules, it is not active in the process of hydrogen sulfide adsorption. This is probably the result of the fouling effect of sulfur or/and sulfuric acid on the catalytic properties of the adsorbents [Stejns, M.; Mars, P. Ind. Eng. Chem. Prod. Res. Dev. 1977, 16, 35; Coskun, I.; Tollefson, E. L. Can. J. Chem. Eng. 1986, 58, 72; Ghosh, T. K.; Tollefson, E. L. Can. J. Chem. Eng. 1986, 64, 960].

Similar trends were observed for activated carbons in which even after exhaustion a significant volume of micropores was still available for nitrogen adsorption [Adib, F.; Bagreev, A.; Bandosz, T. J. Environ. Sci. Technol. 2000, 34, 686; Adib, F.; Bagreev, A.; Bandosz, T. J. J. Coll. Interface Sci. 1999, 214, 407; Adib, F.; Bagreev, A.; Bandosz, T. J J. Coll. Interface Sci. 1999, 216, 360; Adib, F.; Bagreev, A.; Bandosz, T. J. Langmuir 2000, 16, 1980]. Indeed, this is noticed for the S208 carbon before and after impregnation with iron (FIG. 12). If the "catalytic efficiency" of this carbon for hydrogen sulfide immobilization was similar to that of SC-4, its capacity would be much higher because of the larger pore volume. Unfortunately, this is not the case even after impregnation with iron.

Differences in the performance of the materials studied are visualized in the bar diagram (FIG. 13), which presents the specific capacity (capacity divided by surface area, in mg/m$^2$) versus the thermal treatment temperature. The diagram clearly shows that for all sludge-derived carbons except SC-4, the performances of each are similar, suggesting that the mechanism of immobilization is similar. The performance of the acid treated samples except SC-4 is also similar. The exception of the SC-4 sample supports the hypothesis that catalytic centers are formed at 950° C. For comparison, the specific capacities of the S208 and S208-Fe samples are 0.05 mg/m$^2$ and 0.19 mg/m$^2$, respectively. These low values clearly demonstrate the superiority of the surface features of the sludge-derived SC-4 adsorbent crucial for hydrogen sulfide adsorption/oxidation.

As discussed elsewhere [Adib, F.; Bagreev, A.; Bandosz, T. J. Environ. Sci. Technol. 2000, 34, 686; Adib, F.; Bagreev, A.; Bandosz, T. J. J. Coll. Interface Sci. 1999, 214, 407; Adib, F.; Bagreev, A.; Bandosz, T. J J. Coll. Interface Sci. 1999, 216, 360], when activated carbons are used as hydrogen sulfide adsorbents, H$_2$S is oxidized to either sulfur or sulfuric acid. The presence of sulfuric acid is demonstrated by the low temperature peak in the DTG curves (between 200-300° C.), and the presence of sulfur by the peak centered at about 400° C. [Adib, F.; Bagreev, A.; Bandosz, T. J. Environ. Sci. Technol. 2000, 34, 686; Adib, F.; Bagreev, A.; Bandosz, T. J. J. Coll. Interface Sci. 1999, 214, 407; Rodriguez-Mirasol, J.;

Cordero, T.; Rodriguez, J. J. Extended Abstracts of 23rd Biennial Conference on Carbon, College Park, July 1997 p. 376; Chang, C. H. Carbon 1981, 19, 175]. Usually a good correlation is found between the amount of hydrogen sulfide adsorbed on an activated carbon and the amount of species determined using thermal analysis. However, applying the same approach to the sludge-derived materials revealed a significant discrepancy between the amount of sulfur adsorbed and that detected using the TA method. The results are summarized in Table 10 and FIG. 14. Although for some of our samples the two peaks representing sulfur and sulfur dioxide are present, the amount of sulfur as these species was only 20% to 50% of the total sulfur adsorbed. The $SO_2$ peak is well defined (with a shoulder representing sulfur) only for the SC-4E sample. This suggests that heating to 950° C. caused the changes in surface chemistry and porosity that enhanced the, selectivity for oxidation of $H_2S$ to $SO_2$ (Table 10). Changes in this direction also occur after acid treatment, especially for the SC-3A sample where a relatively narrow peak centered at 250° C. is found on the DTG curve. Although in the case of the SC-4A sample the intensity of this peak did not change compared to SC-4, the peak representing elemental sulfur is much more pronounced after acid washing. This finding suggests that the presence of iron and other metals (removed during acid washing) favor $SO_2$ as the reaction product. This is reflected in the changes in the pH of the samples after exhaustion (Table 7). The decrease is more pronounced for acid treated samples than for their initial counterparts. It is necessary to mention here that the discussion above is limited only to two common products of $H_2S$ oxidation, $SO_2$ and elemental sulfur.

Raton, Fla., 1986]. Indeed, when the SC-4E sample was heated to 1300° C. the intensity of a peak centered between 1000° C. and 1200° C. almost doubled (FIG. 14). Although this temperature is higher than the sludge carbonization temperature, such a significant increase in intensity indicates the formation of new species as a result of exposure to hydrogen sulfide. If other catalytically active metals are present their sulfur compounds are expected to be even more thermally stable. Since the presence of $SO_2$ in the effluent gas was checked experimentally and eliminated as a possibility, the only conclusion we can draw at this stage of our study is that sulfur chemically bonds to metal oxides present in the mineral-like forms.

The presence of iron also affects the selectivity of oxidation of $H_2S$ on the S208 carbon. After iron impregnation, more sulfuric acid is formed (FIG. 15) as demonstrated by the significant decrease in pH (Table 7) and the increase in the intensity in the DTG peak at about 230° C. Also supporting the significant role of iron in the selectivity of $H_2S$ oxidation for the S208-FeE sample is the only slight increase in the intensity of the peak assigned to sulfur. As a result of surface modification more $H_2S$ was adsorbed and all of it was converted to sulfur dioxide.

Based on the data presented-above, the sludge-derived adsorbent, SC-4, has superior capacity for hydrogen sulfide adsorption. It performs much better than the coconut shell-based microporous carbon adsorbents currently under consideration as alternatives to caustic-impregnated carbons in sewage treatment plants. On the surface of the sludge-derived adsorbent, hydrogen sulfide is immobilized mainly in the form of sulfur and other compounds resulting from interac-

TABLE 10

Weight loss (%) at the temperature ranges related to the presence of the products of $H_2S$ oxidation and estimated amount of sulfur from breakthrough capacity test ($S_{B.Th}$) and thermal analysis ($S_{TA}$)

| Sample | 150-350° C. | 350-500° C. | 500-700° C. | $S_{TA}$ | $S_{B.Th.}$ | Selectivity for $SO_2$ oxidation (%) |
|---|---|---|---|---|---|---|
| SC-1 | 3.38 | — | — | — | — | — |
| SC-1E | 2.57 | — | — | N/A | 0.77 | — |
| SC-2 | 1.73 | 1.83 | — | | | 20.2 |
| SC-2E | 2.19 | 1.61 | — | 0.23 | 1.14 | — |
| SC-3 | 0.47 | 0.23 | 0.82 | | | 13.1 |
| SC-3E | 1.05 | 0.56 | 0.49 | 0.62 | 2.22 | — |
| SC-4 | 0.12 | 0.01 | 0.07 | | | 16.1 |
| SC-4E | 2.62 | 1.05 | 0.08 | 3.73 | 7.76 | — |
| SC-2A | 2.42 | 2.64 | — | | | 15.8 |
| SC-2AE | 3.05 | 2.98 | — | 0.66 | 1.99 | — |
| SC-3A | 1.17 | 0.93 | 1.19 | | | 35.2 |
| SC-3AE | 5.30 | 1.65 | 1.30 | 2.79 | 5.86 | — |
| SC-4A | 1.44 | 0.52 | 0.08 | | | 20.3 |
| SC-4AE | 3.64 | 1.07 | 0.78 | 1.65 | 5.41 | — |
| S208 | 1.01 | 0.79 | — | | | 15.4 |
| S208E | 2.42 | 1.94 | — | 1.86 | 4.58 | — |
| S208-Fe | 0.34 | 0.17 | — | | | 36.9 |
| S208-FeE | 7.57 | 2.78 | — | 6.23 | 9.81 | — |

Selectivity for $SO_2$ oxidation (%) = amount of $SO_2$ from TA [mmol/g]/amount of $H_2S$ adsorbed from breakthrough capacity test [mmol/g] × 100

Failure to account for all the sulfur deposited on the surface suggests that new species are formed whose decomposition temperatures are higher than the 1000° C. used in our experiment. Even if we assume that $FeS_x$ is a reaction product in the form of troilite (FeS, melting point: 1193-1200° C.) or pyrite ($FeS_2$, melting point: 1171° C.) its DTG peak should appear at temperatures as high as 1200° C. [Handbook of Chemistry and Physics, 67th ed., Weast, R. C. Ed. CRC press, Boca tions of $H_2S$ with mineral-like metal oxides containing iron, zinc, copper, and/or others. Under our experimental conditions, the capacity of the best sludge-derived adsorbents is exhausted when all pores are filled with the oxidation products.

G. Results and discussion concerning materials pyrolyzed at temperatures between 800-1000° C.

Organic fertilizer, Terrene®, was pyrolyzed in a nitrogen atmosphere at 800-1000° C. for 1 hour with heating rate 10 deg/min. As a result, a new adsorbent was obtained. It consists porous activated carbon (around 20%) with incorporated organic nitrogen species and inorganic matter (around 80%) with highly dispersed catalytic oxides such as iron, copper, zinc and calcium oxides, alumina, silica, etc. The specific surface areas and micropore volumes calculated using DFT (Density Functional Theory) method are around 120 m$^2$/g and 0.050 cm$^3$/g, respectively.

The adsorbents obtained are used to remove hydrogen sulfide and other acidic gases (such as sulfur dioxide) from wet air streams. The performance test was designed in our lab and the conditions are described in the literature [Adib, Bagreev and Bandosz, J. Colloid Interface. Sci. 214, 407-415, 1999]. The results showed that the breakthrough capacity of the new adsorbent is comparable to the capacity for caustic-impregnated activated carbons and greater than that for coconut-based carbon (FIG. 17). The latter material is an alternative sorbent recently under consideration to replace caustic-impregnated activated carbon commonly used to remove hydrogen sulfide from effluent air in sewage treatment plants. Table 11 shows the capacity of the sample pyrolyzed at 950° C. The capacity increases with an increasing bed size (increasing residence time), however, at residence time around 1.3 second (similar to the residence time at sewage treatment plant) the reaction is close to completion and the capacity become more or less constant. The trend is shown in FIG. 16. In FIG. 16 we also report the performance of the coconut-shell based carbon measured under the same conditions. The capacity measured for caustic-impregnated carbon is also noted.

TABLE 11

Changes in the performance of the adsorbent pyrolyzed at 950° C. with increasing size of the bed.

| Weight [g] | Volume [cm$^3$] | Depth [cm] | Residence time [sec] | Breakthrough-Time At 500 ppm [min] | H$_2$S Ads. at 500 ppm [mg/g] |
|---|---|---|---|---|---|
| 1.2 | 3 | 4 | 0.2 | 50 | 53 |
| 3.9 | 6 | 8 | 0.3 | 157 | 81 |
| 4.0 | 6 | 8 | 0.3 | 126 | 65 |
| 7.7 | 6 | 16 | 0.6 | 770 | 202 |
| 15.1 | 12 | 31 | 1.2 | 1885 | 259 |
| 26.9 | 24 | 54 | 2.0 | 3770 | 291 |

The analysis of the performance of samples pyrolyzed at various temperatures indicates that significant chemical changes in the nature of adsorbent occur between 800 and 950° C. resulting in a four-fold increase in the capacity (FIG. 13). The surface area and micropore volume increase only 20% for the sample pyrolyzed at 950° C. compared to that pyrolyzed at 800° C.

On the surface of the new adsorbent, hydrogen sulfide is chemically bonded to metal compounds creating stable sulfides and sulfide-like species. Moreover, the surface, due to the presence of catalytic metals and basic nitrogen groups catalyzes oxidation of hydrogen sulfide to elemental sulfur. The process continues until the pore structure is completely filled with oxidation products. The pH of the spent material is close to neutral. Table 12 shows the changes in the surface area, S, and pore volumes (total pore volume, Vt, and volume of micropores, V$_{mic}$) for the samples (pyrolyzed at 800 and 950° C.) before and after H$_2$S adsorption.

TABLE 12

Changes in the surface area, S$_{N2}$, and pore volumes (total pore volume, V$_t$, and volume of micropores, V$_{mic}$) for the samples (pyrolyzed at 800 and 950° C.) before and after H$_2$S adsorption. (Bed volume - 6 mL)

| Sample | S$_{N2}$-initial [m$^2$/g] | S$_{N2}$ after H$_2$S ads. [m$^2$/g] | V$_{mic}$-initial [cm$^3$/g] | V$_{mic}$-after H$_2$S ads. [cm$^3$/g] | V$_t$-initial [cm$^3$/g] | V$_t$-after H$_2$S ads [cm$^3$/g] |
|---|---|---|---|---|---|---|
| 800° C. | 104 | 17 | 0.044 | 0.008 | 0.132 | 0.066 |
| 950° C. | 122 | 21 | 0.051 | 0.009 | 0.158 | 0.081 |

What is claimed is:

1. A method of making an adsorbent, said method consisting essentially of:
    (a) thermally drying dewatered sewage sludge;
    (b) granulating said dried sludge; and
    (c) pyrolyzing said granulated dried sludge under pyrolysis conditions suitable to provide an adsorbent having a basic pH,
    said pyrolysis conditions being in an inert atmosphere at a temperature between 600 and 1000° C., wherein said temperature is reached at a heating rate between 5 and 10° C/minute and hold time for the pyrolysis is between 60 and 90 minutes;
    wherein said adsorbent maintains a basic pH after hydrogen sulfide adsorption to a breakthrough capacity, and
    wherein steps (a)-(c) are conducted only with heat and physical processing.

2. A method as defined in claim 1, wherein said pyrolysis is conducted at a temperature between 800 and 1000° C.

3. A method as defined in claim 2, wherein said pyrolysis is conducted at a temperature between 900 and 1000° C.

4. A method as defined in claim 1, wherein said pyrolysis is conducted at a temperature between 600 and 900° C.

5. A method as defined in claim 4, wherein said pyrolysis is conducted at a temperature between 800 and 900° C.

* * * * *